US007601188B2

(12) United States Patent
Hwang et al.

(10) Patent No.: US 7,601,188 B2
(45) Date of Patent: Oct. 13, 2009

(54) VACUUM CLEANER

(75) Inventors: Man Tae Hwang, Changwon-si (KR); Hae Seock Yang, Changwon-si (KR); Hoi Kil Jeong, Changwon-si (KR); Myung Sig Yoo, Changwon-si (KR); Jae Kyum Kim, Kimhae-si (KR); Moo Hyun Ko, Moonkyung-si (KR); Kie Tak Hyun, Changwon-si (KR); Jong Su Choo, Busan-si (KR); Young Bok Son, Changwon-si (KR); Kyeong Seon Jeong, Changwon-si (KR); Min Park, Busan-si (KR); Sung Hwa Lee, Changwon-si (KR); Il Joong Kim, Masan-si (KR); Jin Hyouk Shin, Busan-si (KR); Gun Ho Ha, Busan-Si (KR); Jin Wook Seo, Busan-si (KR); Chang Ho Yun, Changwon-si (KR); Jin Young Kim, Busan-si (KR); Chang Hoon Lee, Kyungsangnam-do (KR); Yun Hee Park, Kimhae-si (KR)

(73) Assignee: LG Electronics Inc., Seoul (KR)

( * ) Notice: Subject to any disclaimer, the term of this patent is extended or adjusted under 35 U.S.C. 154(b) by 41 days.

(21) Appl. No.: 11/713,022

(22) Filed: Mar. 2, 2007

(65) Prior Publication Data

US 2007/0256272 A1 Nov. 8, 2007

Related U.S. Application Data

(63) Continuation of application No. 11/565,206, filed on Nov. 30, 2006.

(30) Foreign Application Priority Data

| | | |
|---|---|---|
| Dec. 20, 2005 | (KR) | 2005-0121279 |
| Dec. 20, 2005 | (KR) | 2005-0126270 |
| Dec. 29, 2005 | (KR) | 2005-0134094 |
| Feb. 24, 2006 | (KR) | 2006-0018119 |
| Feb. 24, 2006 | (KR) | 2006-0018120 |
| May 3, 2006 | (KR) | 2006-0040106 |
| May 17, 2006 | (KR) | 2006-0044359 |
| May 17, 2006 | (KR) | 2006-0044362 |
| May 20, 2006 | (KR) | 2006-0045415 |
| May 20, 2006 | (KR) | 2006-0045416 |
| May 23, 2006 | (KR) | 2006-0046077 |
| Sep. 6, 2006 | (KR) | 2006-0085919 |
| Sep. 6, 2006 | (KR) | 2006-0085921 |
| Oct. 10, 2006 | (KR) | 2006-0098191 |

(51) Int. Cl.
*B01D 45/12* (2006.01)

(52) U.S. Cl. ..... 55/343; 55/346; 55/349; 55/429; 55/459.1; 55/DIG. 3; 96/380; 96/382

(58) Field of Classification Search ..... 55/343, 55/346, 349, 429, 459.1, DIG. 3; 96/380, 96/382

See application file for complete search history.

(56) References Cited

U.S. PATENT DOCUMENTS 2,283,836 A 5/1942 White (Continued)

FOREIGN PATENT DOCUMENTS

AU 2005229774 8/2006

(Continued)

OTHER PUBLICATIONS

Korean Office Action dated Aug. 29, 2008.

(Continued)

*Primary Examiner*—Robert A Hopkins
(74) *Attorney, Agent, or Firm*—KED & Associates LLP

(57) ABSTRACT

A vacuum cleaner includes at least one cyclone dust separation unit. A cover is formed over the cyclone dust separation unit to attenuate noise generated by the cyclone unit. Dimples or recesses may be formed on the interior of the cover to further attenuate noise. In addition, a noise attenuating material may be inserted between the cyclone dust separation unit and the cover.

10 Claims, 25 Drawing Sheets

U.S. PATENT DOCUMENTS

| | | | | |
|---|---|---|---|---|
| 4,601,082 | A | 7/1986 | Kurz | |
| 5,135,552 | A | 8/1992 | Weistra | |
| 5,233,682 | A | 8/1993 | Abe et al. | |
| 5,251,358 | A | 10/1993 | Moro et al. | |
| 5,265,305 | A | 11/1993 | Kraft et al. | |
| 5,323,483 | A | 6/1994 | Baeg | |
| 5,542,146 | A | 8/1996 | Hoekstra et al. | |
| 6,625,845 | B2 | 9/2003 | Matsumoto et al. | |
| 2002/0088079 | A1 | 7/2002 | Oh | |
| 2002/0124538 | A1 | 9/2002 | Oh et al. | |
| 2004/0211025 | A1 | 10/2004 | Jung et al. | |
| 2005/0091787 | A1 | 5/2005 | Bair et al. | |
| 2005/0138763 | A1 * | 6/2005 | Tanner et al. | 15/353 |
| 2005/0172584 | A1 | 8/2005 | Oh et al. | |
| 2005/0252179 | A1 | 11/2005 | Oh et al. | |
| 2007/0136980 | A1 | 6/2007 | Fujiwara et al. | |
| 2007/0209339 | A1 * | 9/2007 | Conrad | 55/345 |
| 2008/0052870 | A1 | 3/2008 | Lee et al. | |

FOREIGN PATENT DOCUMENTS

| | | |
|---|---|---|
| CN | 2186039 | 12/1994 |
| CN | 2409894 | 12/2000 |
| CN | 1593324 | 3/2005 |
| FR | 2 823 091 | 10/2002 |
| GB | 2 368 516 | 5/2002 |
| GB | 2404887 | 2/2005 |
| GB | 2 406 064 | 3/2005 |
| GB | 2416721 | 2/2006 |
| JP | 50-022355 | 3/1975 |
| JP | 54-28457 | 3/1979 |
| JP | 54-085560 | 7/1979 |
| JP | 54-085561 | 7/1979 |
| JP | 54161751 | 12/1979 |
| JP | 58-175532 | 10/1983 |
| JP | 58-218934 | 12/1983 |
| JP | 06-054778 | 3/1994 |
| JP | 6-54778 | 3/1994 |
| JP | 7-241265 | 9/1995 |
| JP | 408000514 | 1/1996 |
| JP | 08-140907 | 6/1996 |
| JP | 10-243900 | 9/1998 |
| JP | 11-004789 | 1/1999 |
| JP | 2000-262449 | 9/2000 |
| JP | 2002-143060 | 5/2002 |
| JP | 2002-360474 | 12/2002 |
| JP | 2003-019097 | 1/2003 |
| JP | 2003-119575 | 4/2003 |
| JP | 2003-125995 | 5/2003 |
| JP | 2003-199695 | 7/2003 |
| JP | 2003-310502 | 11/2003 |
| JP | 2004-065357 | 3/2004 |
| JP | 06-061439 | 3/2006 |
| KR | 1993-0008369 | 8/1993 |
| KR | 2002-0091510 | 12/2002 |
| KR | 10-2005-0005611 | 1/2005 |
| KR | 10-2005-0013694 | 2/2005 |
| KR | 10-2006-0031442 | 4/2006 |
| KR | 2006-0116992 | 11/2006 |
| KR | 10-2006-0031442 | 12/2006 |
| KR | 10-2007-0088022 | 8/2007 |
| RU | 2172132 | 8/2001 |
| RU | 2 243 714 | 1/2005 |
| RU | 2 269 919 | 9/2005 |
| SU | 1326236 | 7/1987 |
| WO | WO 00/74548 | 12/2000 |
| WO | WO 01/60524 | 8/2001 |
| WO | WO 2004/064591 | 8/2004 |
| WO | WO2005099545 | 10/2005 |

OTHER PUBLICATIONS

Japanese Office Action dated Sep. 18, 2008.
Japanese Office Action dated Mar. 13, 2009.
Chinese Office Action dated Jun. 5, 2009 (translation).
European Search Report dated Jun. 16, 2009 (in English).
Chinese Office Action dated Jul. 3, 2009 (with translation).

* cited by examiner

VACUUM CLEANER

This application claims priority to the filing date of Korean Patent Application No. KR2006-0040106, filed May 3, 2006, the contents of all of which are hereby incorporated by reference. This application is also a continuation of U.S. application Ser. No. 11/565,206, which was filed Nov. 30, 2006.

FIELD

The present application discloses a vacuum cleaner, and more particularly, a vacuum cleaner having a removable dust collection unit.

BACKGROUND

Vacuum cleaners can be generally classified into a canister type and an upright type. The canister type vacuum cleaner includes a main body and a suction nozzle connected to the main body by a connection pipe. The upright type vacuum cleaner includes a main body and a suction nozzle integrally formed with the main body.

A conventional cyclone type vacuum cleaner includes a suction nozzle for sucking air containing dust, a main body unit communicating with the suction nozzle, a cyclone dust separation unit for separating dust contained in the air, and a dust collection unit for storing the separated dust. The vacuum cleaner may also include an extension pipe for guiding the air sucked through the suction nozzle toward the main body unit, and a connection hose having a first end connected to the extension pipe and a second end connected to the main body unit.

In some conventional cyclone vacuum cleaners, the cyclone dust separation unit is incorporated into the dust collection unit. Also, some conventional cyclone vacuum cleaners make use of a main cyclone unit for separating relatively large-sized dust particles contained in the air, and one or more secondary cyclone units disposed downstream of the main cyclone unit to separate relatively small-sized dust particles from the air. Typically, the dust collection unit includes both of the main cyclone unit and the secondary cyclone units.

A conventional cyclone vacuum cleaner with a dust collection unit that also houses the main and secondary cyclone units has several problems.

First, because the dust collection unit must house the main and secondary cyclone units, if the dust collection unit is designed to store a large amount of collected dust, the dust collection unit becomes very large. This makes it difficult to handle.

Alternatively, if the dust collection unit is designed to be small, so that it is easy to handle, the fact that the dust collection unit also includes the cyclone units means that there is very little space left over for storing collected dust. This means the dust collection unit must be emptied more frequently.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Figure 1A:
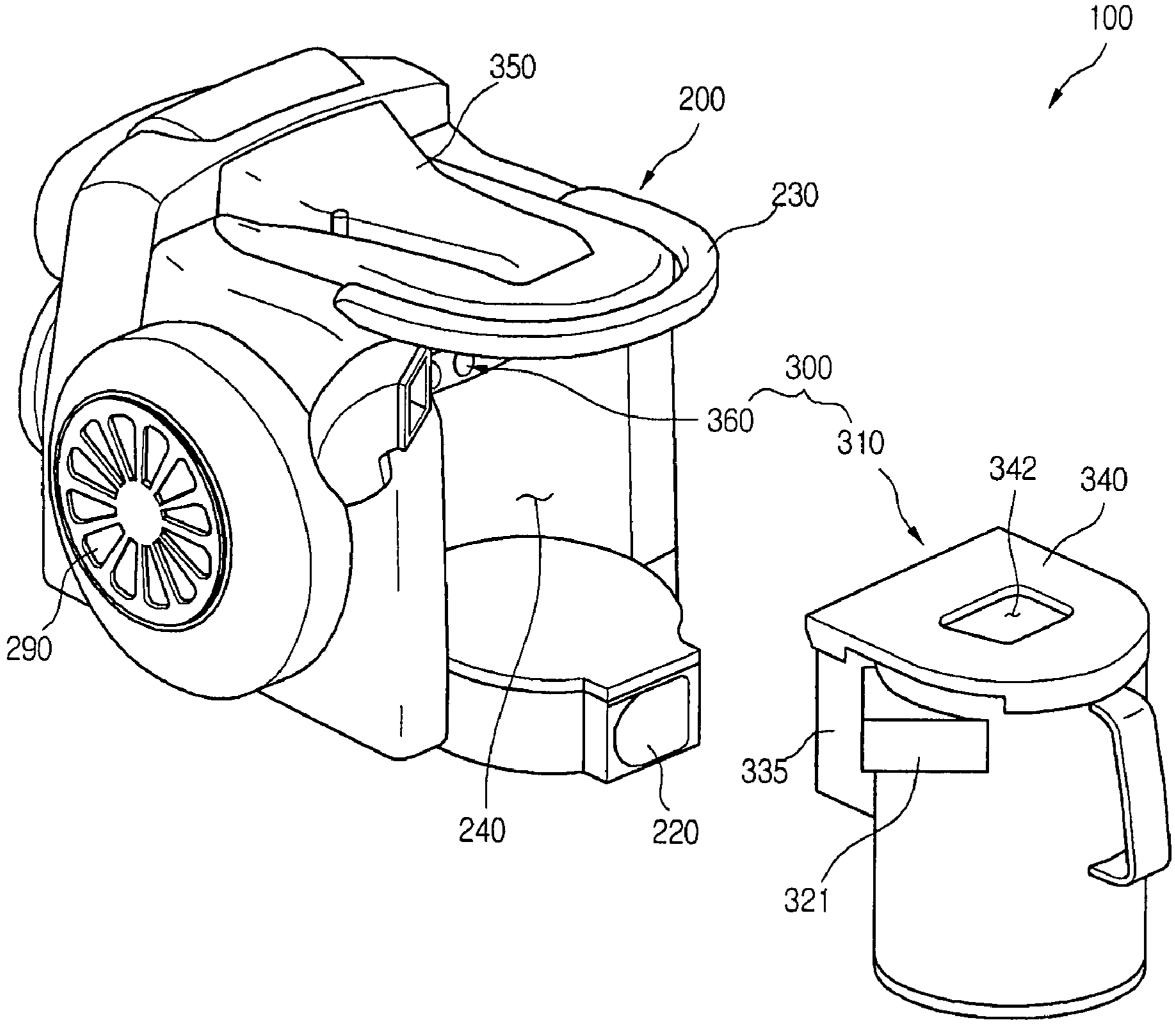
FIGS. 1A and 1B are perspective views of vacuum cleaners according to embodiments of the present invention showing how dust collection units are separated from the vacuum cleaner.
Figure 2:
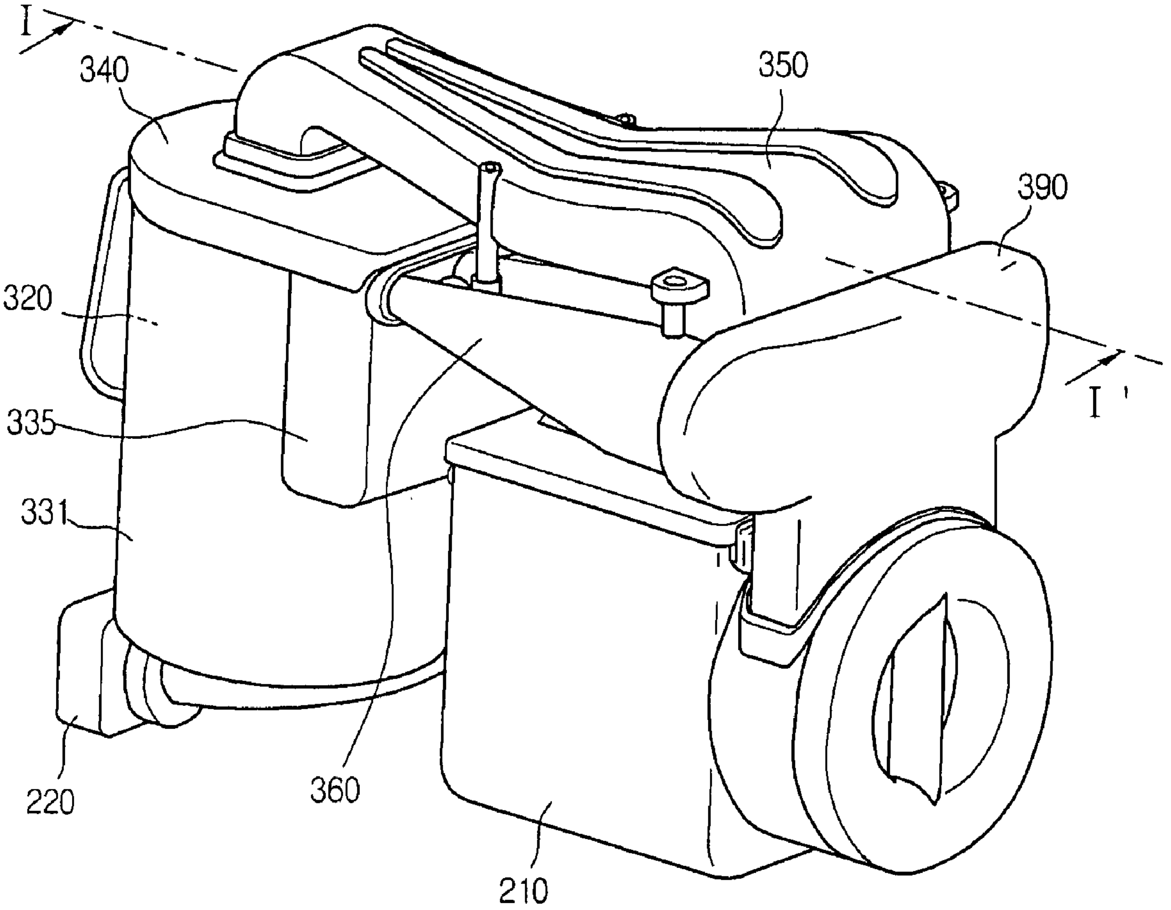
FIG. 2 is a perspective view of elements of the vacuum cleaner of FIG. 1A, when a dust collection unit is assembled with the other elements of the vacuum cleaner.

FIG. 1A shows a vacuum cleaner according to a first embodiment of the present invention. In this figure, the dust collection unit is separated from the vacuum cleaner. FIG. 2 is a perspective view of the vacuum cleaner FIG. 1A when the dust collection unit is assembled with other elements of the vacuum cleaner. FIG. 3 is a sectional view of this embodiment taken along line I-I of FIG. 2.

Referring to FIGS. 1A through 3, the vacuum cleaner 100 includes a main body unit 200, a driving unit 210 disposed in the main body unit 200 to generate suction for sucking air containing dust, a suction nozzle (not shown) for sucking the air containing dust into the main body unit 200, and a dust separation and collection unit 300.

A main body suction portion 220, which is in communication with the suction nozzle, is formed on a front-lower portion of the main body unit 200. A main body discharge portion 290 discharges the air after it has passed through the cyclone units to remove the dust in the incoming air stream.

The driving unit 210 includes a fan motor assembly 211 received in a fan-motor chamber 213 formed in the main body unit The dust separation and collection unit 300 includes a removable dust collection unit 310 and a secondary cyclone unit 360 which is mounted on the main body unit 200. A main cyclone unit 320 is provided in the dust collection unit 310. In this embodiment, the dust collection unit 310 collects dust separated in the main cyclone unit 320 and the secondary cyclone unit 360.

The dust collection unit 310 is detachably mounted in the main body unit 200. The user can separate the dust collection unit 310 from the main body unit 200 to empty the dust collection unit 310. When the dust collection unit 310 is re-mounted on the main body unit 200, the dust collection unit 310 is re-connected to the secondary cyclone unit 360.

The main dust separation unit 320 is disposed upstream of the secondary cyclone unit 360. The main dust separation unit 320 separates relatively large diameter dust particles from the incoming air stream. After the air stream leaves the main cyclone unit 320 it is routed to the secondary cyclone unit 360, which acts to separate out smaller particles of dust, thereby improving the dust separation performance.

The main dust separation unit 320 is integrally formed with the dust collection unit 310. In the embodiment shown in the drawings, the cyclone principle is used to separate dust from the air. However, the present invention is not limited to this embodiment. In other embodiments, alternate mechanism could be used to filter dust particles out of the incoming air stream.

In the following description, the dust separation unit located in the dust collection unit 310 will be called a main cyclone unit 320. The cyclone unit 360 provided in the main body unit 200 will be called the secondary cyclone unit 360. But again, as noted above, either of the dust separation units could incorporate cyclones or other types of dust filtering mechanisms without departing from the spirit and scope of the invention.

The main cyclone unit 320 is integrally formed with an upper portion of the dust collection unit 310. The main cyclone unit 320 is provided with a first sucking portion 321 formed in a tangent direction relative to the cylindrical outer surface of the dust collection unit 310. The first sucking portion 321 allows the air containing dust to be introduced into the main cyclone unit 320 in a tangential direction.

A discharge member 323 is located at a top center of the main cyclone unit 320. The discharge member 323 can be conical, cylindrical, or have different shapes. The discharge member 323 is provided with a plurality of holes 324 which allow air to escape the main cyclone unit 320, but which filter out large dust particles.

Figure 3A:
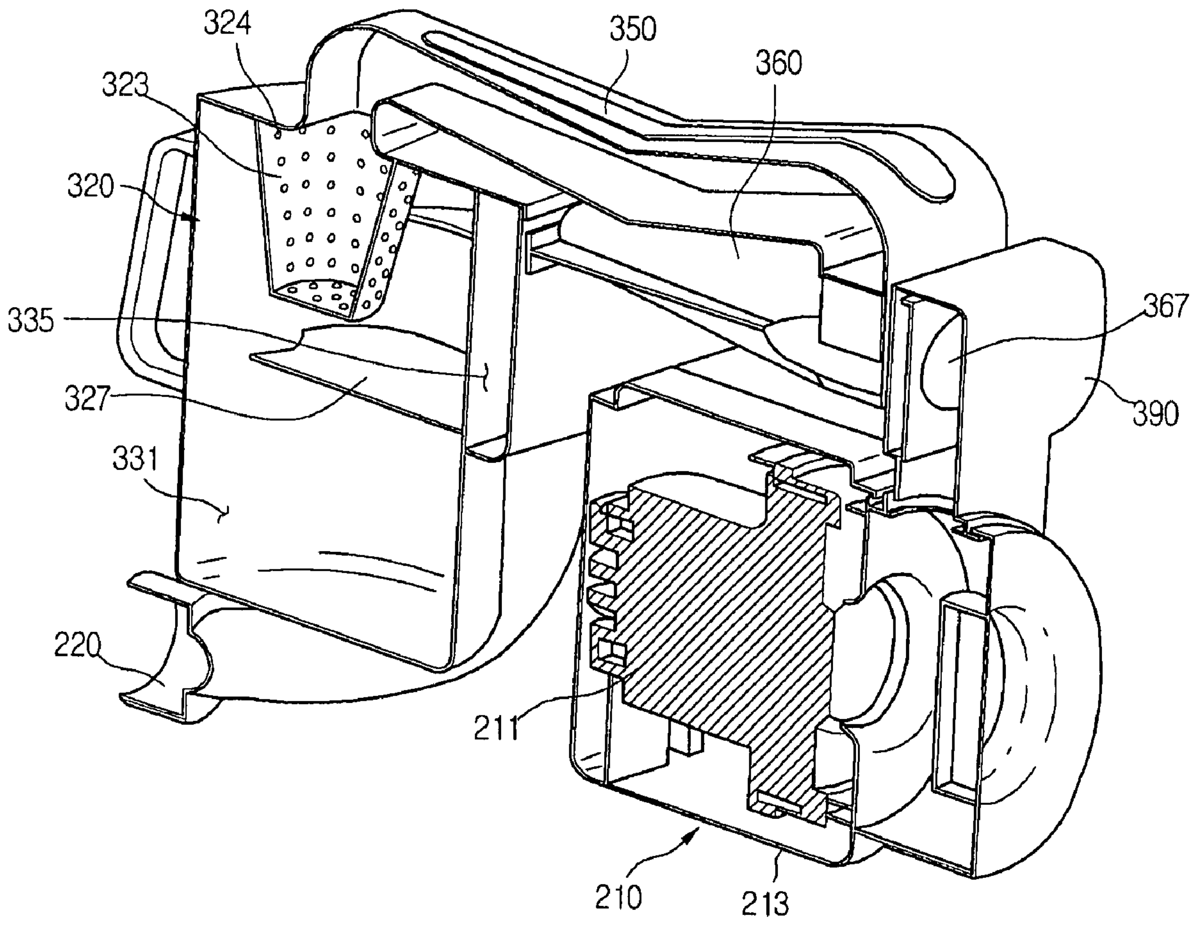
FIG. 3A is a sectional view taken along line I-I of FIG. 2.
Figure 3B:
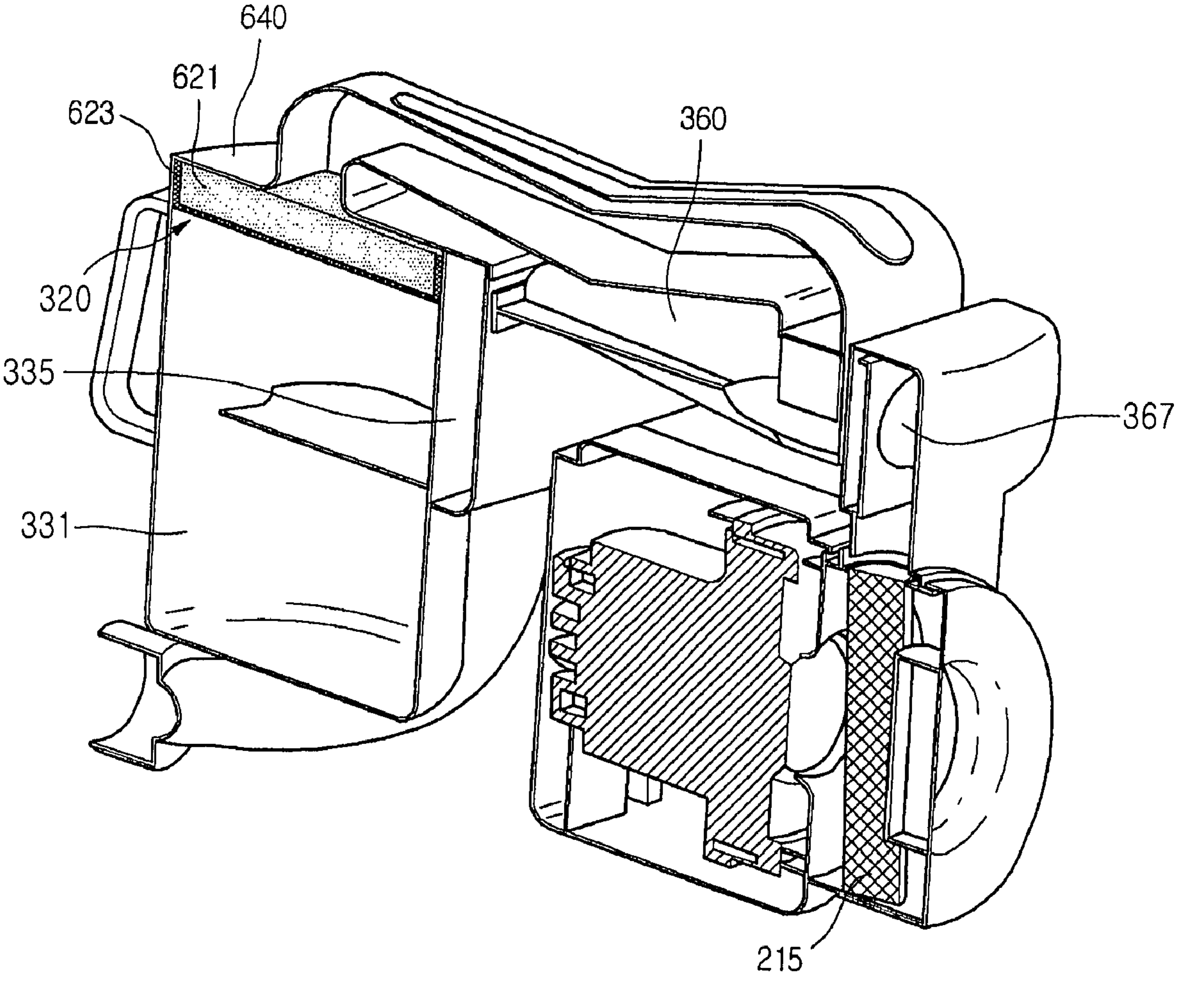
FIG. 3B is a sectional view of an alternate embodiment of a vacuum cleaner taken along line I-I of FIG. 2.

In alternate embodiments, the discharge member could be replaced with some other type of filtering element. FIG. 3B shows an alternate embodiment where a dust collecting filter element 621 is installed over the outlet of the main cyclone unit 320. A filter mounting unit 623 is used to hold the dust collecting filter element 621.

The dust collecting filter 621 may be formed of a sponge-like material, a non-woven fabric, or other materials. Because dust particles are likely to become trapped on the dust collecting filter 621, the dust collecting filter would be designed to be removed and periodically cleaned or replaced. This means that the vacuum must be designed to allow for removal of the dust collecting filter.

In the embodiment shown in FIG. 3B, after the upper cover 640 is removed from the upper portion of the dust collecting unit the dust collecting filter 621 could be removed to cleaning or replacement. In other embodiments, the upper portion may be designed such that the dust collecting filter could be slid out of the filter mounting unit 623.

Figure 6:
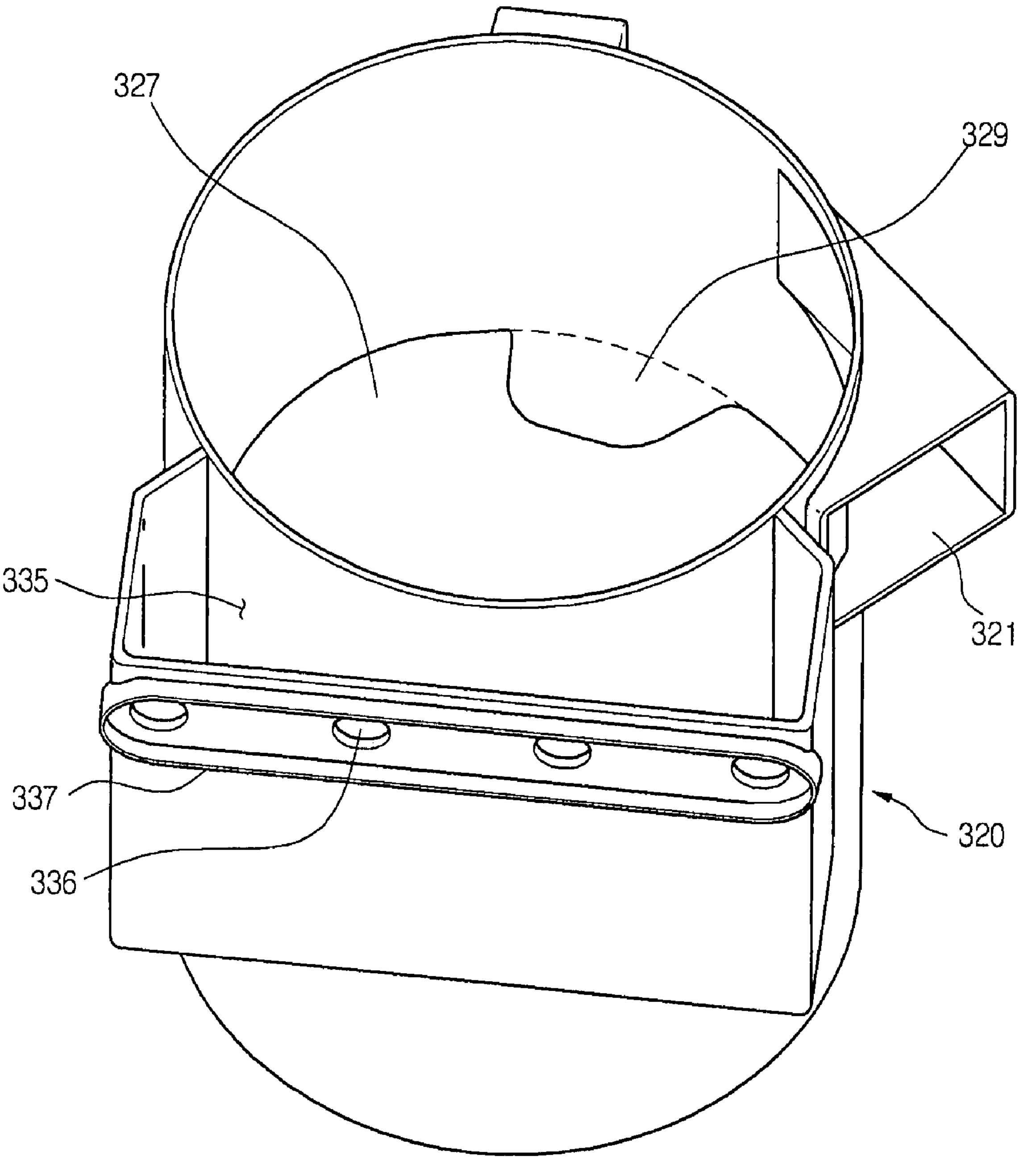
FIG. 6 is a front perspective view of the dust collection unit of FIG. 4.

Returning now to the embodiment shown in FIG. 3A, the dust collection unit 310 includes a main chamber 331, located below the main cyclone unit 320, for storing dust separated by the main cyclone unit 320. In order to prevent the dust stored in the main chamber 331 from scattering toward the main cyclone unit 320, which would be caused by the spiral motion of the air, a scattering prevention unit 327 is located between the main cyclone unit 320 and the main dust collecting chamber 331. The scattering prevention unit 327 may take the form of a plate that extends horizontally across a central portion of the dust collection unit 310. As shown in FIG. 6, an opening 329 is formed at an edge of the scattering prevention unit 327 to allow dust separated by the main cyclone unit 320 to move downward into the main dust collecting chamber 331.

In addition, a sub-chamber 335 is provided on an outer side of the dust collection unit 310. The sub-chamber 335 is configured to store dust separated by the secondary cyclone unit 360, as will be described in greater detail below. In the embodiment shown in FIG. 1A, the sub-chamber 335 is integrally formed with the dust collection unit 310. However, in alternate embodiments, the sub-chamber 335 may be separate from the dust collection unit 310.

Figure 1B:
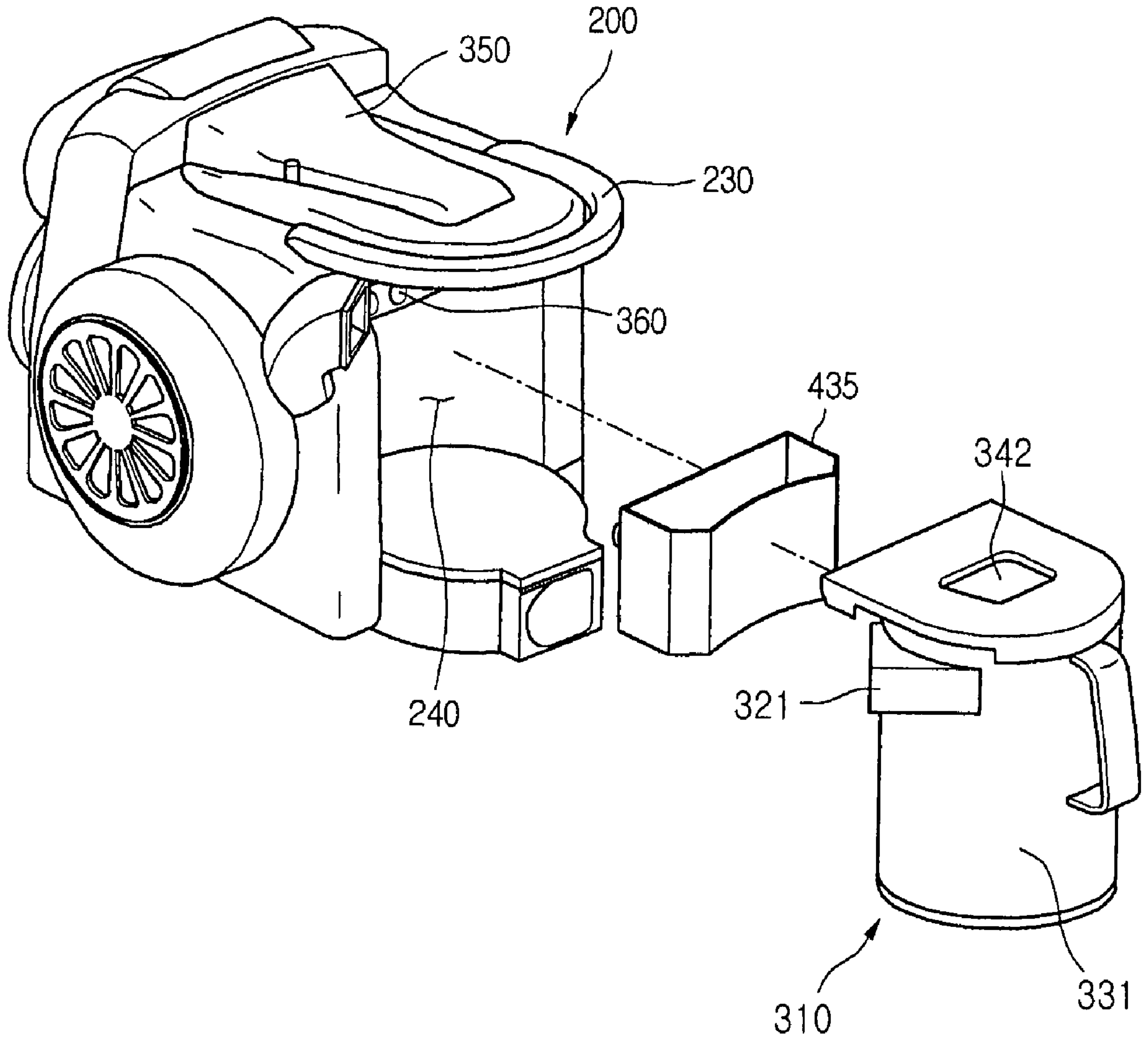

For instance, FIG. 1B illustrates an embodiment where a separate sub-chamber 435 is detachably mounted on the main body. The surface of the sub-chamber 435 which faces the dust collection unit 310, may be formed to correspond to the exterior shape of the dust collection unit 310. The sub-chamber would be configured to receive the dust separated in the secondary cyclone unit 360.

Typically, the main cyclone unit 320 would separate a much larger amount of dust from the incoming air stream than the secondary cyclone unit 360. As a result, the main dust collection unit 331 would receive a much larger volume of dust during operation of the vacuum cleaner than the sub-chamber 435. As a result, the user would be emptying the main dust collection unit 310 and the associated main dust collection chamber 331 more frequently than the sub-chamber 435.

Returning now to the embodiment shown in FIG. 1B, as the dust collection unit 310 is mounted in the main body unit 200, the sub-chamber 335 is connected to the secondary cyclone unit 360 so that dust separated by the secondary cyclone unit may be stored in the sub-chamber 335. The sub-chamber 335 is not integrally formed with the secondary cyclone unit 360. Instead, the secondary cyclone unit 360 is configured to be separate, but connectable to, the dust collection unit 310. This allows the secondary cyclone unit 360 to be mounted on the main body 200. But because the secondary cyclone unit can deliver separated dust to the removable dust collection unit 310, the user can still easily empty out dust that is separated in the secondary cyclone unit 360.

As noted above, air is delivered to the secondary cyclone unit 360 after it has passed through the main cyclone unit 320. The upper cover 340 of the main cyclone unit 320 has a discharge portion which allows air passing through the discharge member 323 to be discharged out of the main cyclone unit 320.

Figure 4:
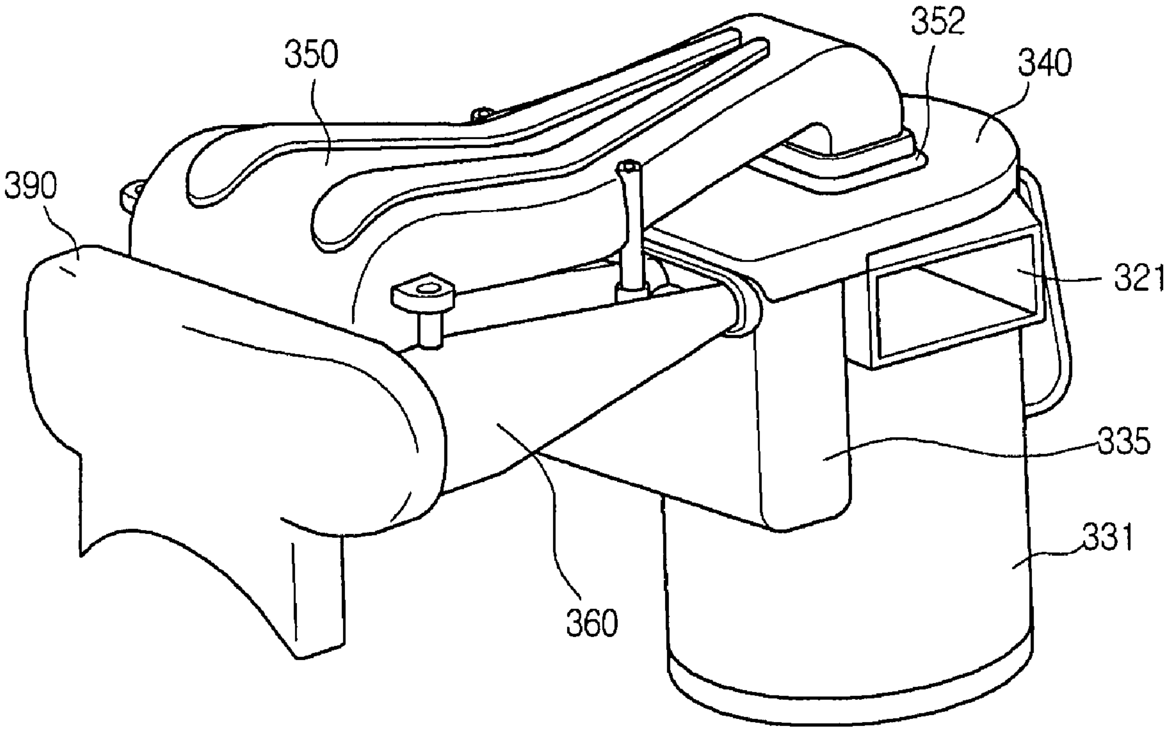
FIG. 4 is a perspective view of a dust separation device of the vacuum cleaner of FIGS. 1A, and 2.
Figure 5:
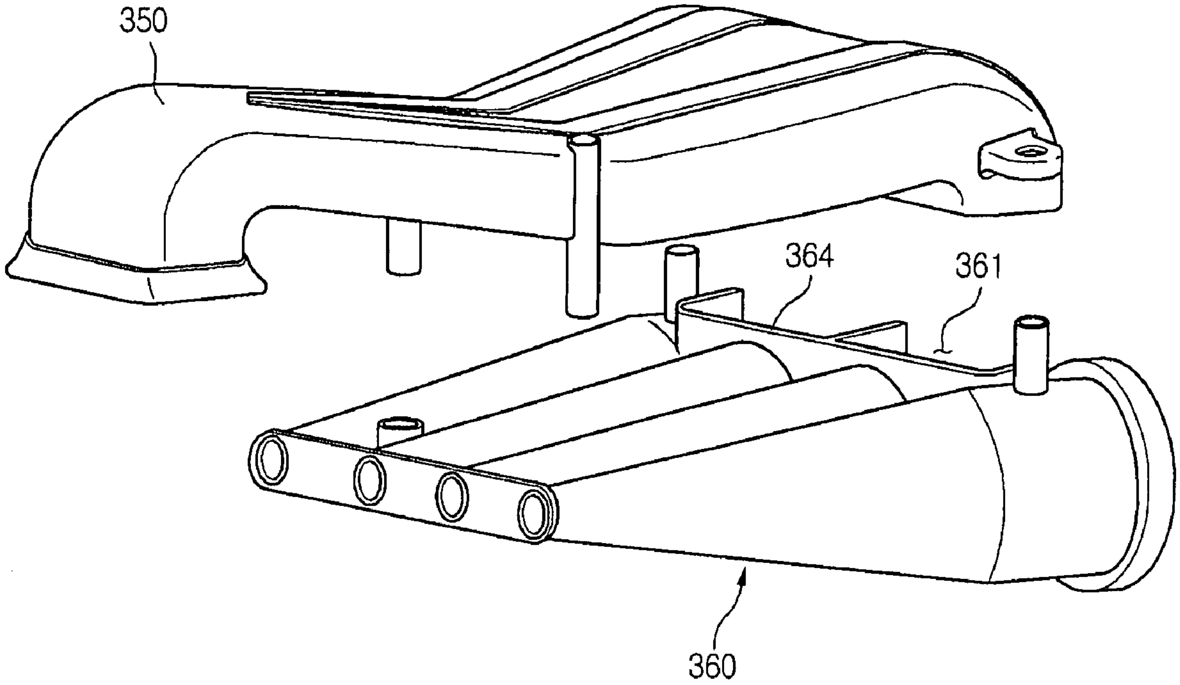
FIG. 5 is a perspective view of a connection between a secondary cyclone unit and a connection duct of the vacuum cleaner of FIGS. 1A and 2.

The connection structure between the main cyclone unit and the secondary cyclone unit will now be described with reference to FIGS. 4-5. FIG. 4 is a perspective view showing the dust collection unit coupled to the secondary cyclone unit 360. FIG. 5 is a perspective view of a coupling structure.

The main cyclone unit 320 and the secondary cyclone unit 360 are interconnected by a connection duct 350. The connection duct 350 has a first side connected to the upper cover 340 disposed on an upper portion of the main cyclone unit 320. A second side of the connection duct 350 is connected to a coupling hole 364 formed on an upper portion of the secondary cyclone unit 360.

The connection duct 350 preferably has a cross-section that gradually increases toward the coupling hole 364 on the secondary cyclone unit 360. Therefore, the velocity of the air passing through the connection duct 350 is gradually reduced as it approaches the coupling hole 364 of the secondary cyclone unit 360. This also reduces the flow resistance of the air as it nears the coupling hole 364 of the secondary cyclone unit 360.

A sealing member 352 may be provided between the connection duct 350 and the upper cover 340. Another sealing member may be provided between the connection duct 350 and the coupling hole 364.

Figure 7:
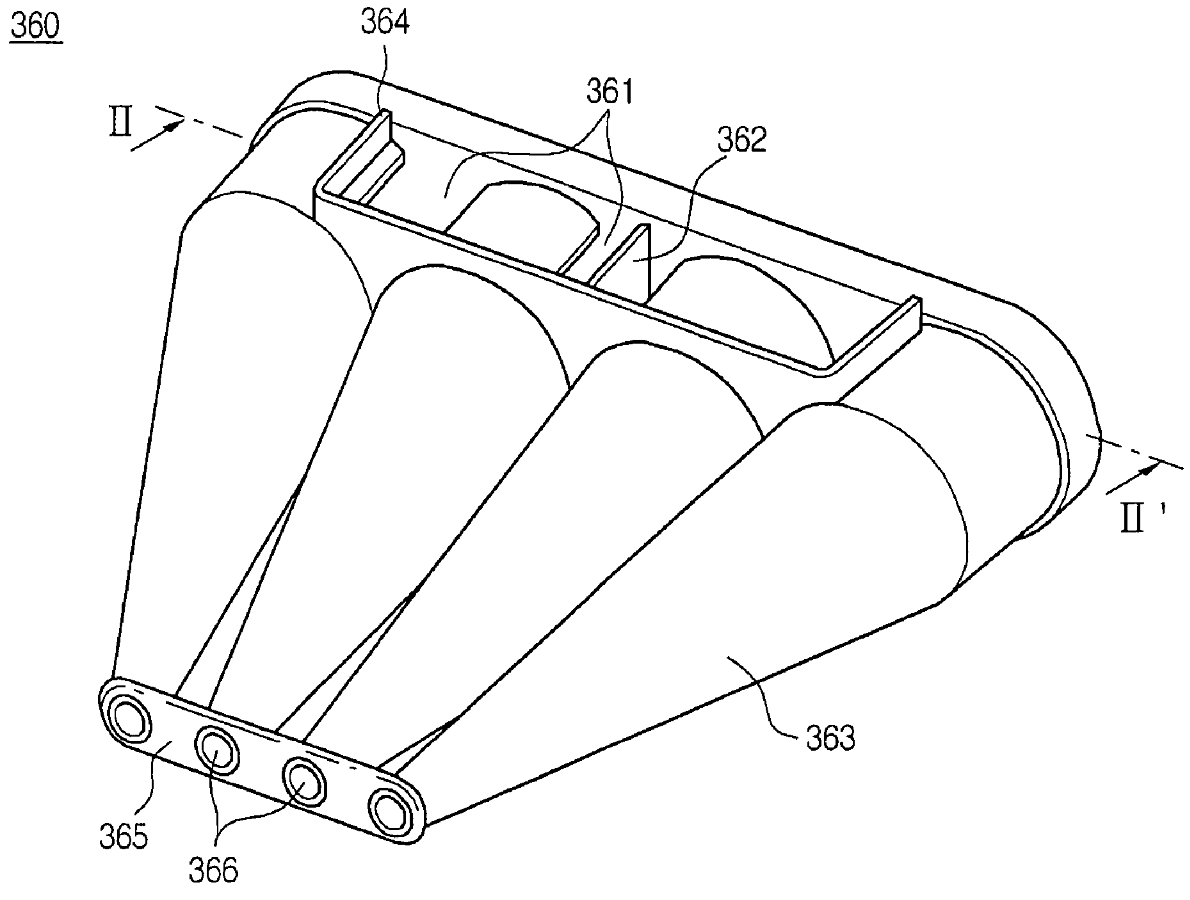
FIG. 7 is a perspective view of the secondary cyclone unit shown in FIG. 5.

FIG. 6 is a perspective view of the dust collection unit 310 and FIG. 7 is a perspective view of the secondary cyclone unit 360. Referring to FIGS. 6 and 7, a chamber coupling end 365 of the secondary cyclone unit 360 is directly connected to the sub-chamber 335 of the dust collection unit 310. A coupling portion 337 on the dust collecting unit 310 formed on an outer wall of the sub-chamber 335 is configured to receive the chamber coupling end 365 of the secondary cyclone unit 360. The coupling portion 337 is formed in a shape corresponding to the chamber connection end 365.

The sub-chamber 335 is provided with one or more dust introducing holes 336, through which the dust separated by the secondary cyclone unit 360 may enter the sub-chamber 335. The dust introducing holes 336 may be designed to be larger than a dust discharge hole 366 of the sub-cyclone unit 360. That is, when the secondary cyclone unit 360 is coupled to the sub-chamber 335, the dust discharge holes 366 on the secondary cyclone unit may be partly inserted into the dust introducing hole 336 to prevent the dust from leaking out of the sub-chamber 335.

The number of the dust introducing holes 336 is same as that of the dust exhaust holes 366. Alternatively, a plurality of dust exhaust holes 366 on the secondary cyclone 360 may be inserted in one large dust introducing hole 336.

Figure 8:
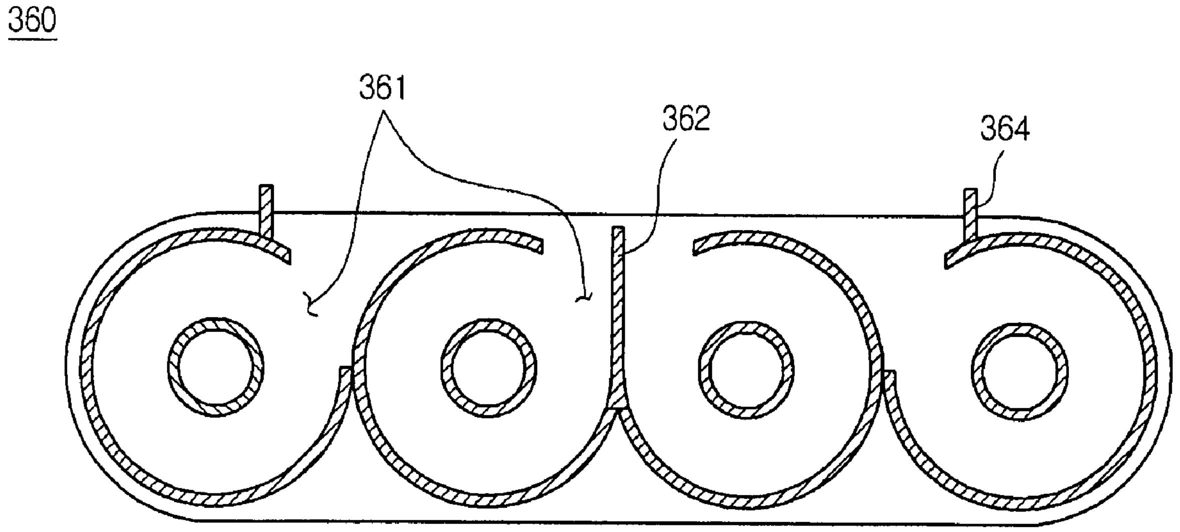
FIG. 8 is a sectional view of one embodiment of the secondary cyclone unit taken along line II-II' of FIG. 7.
Figure 9:
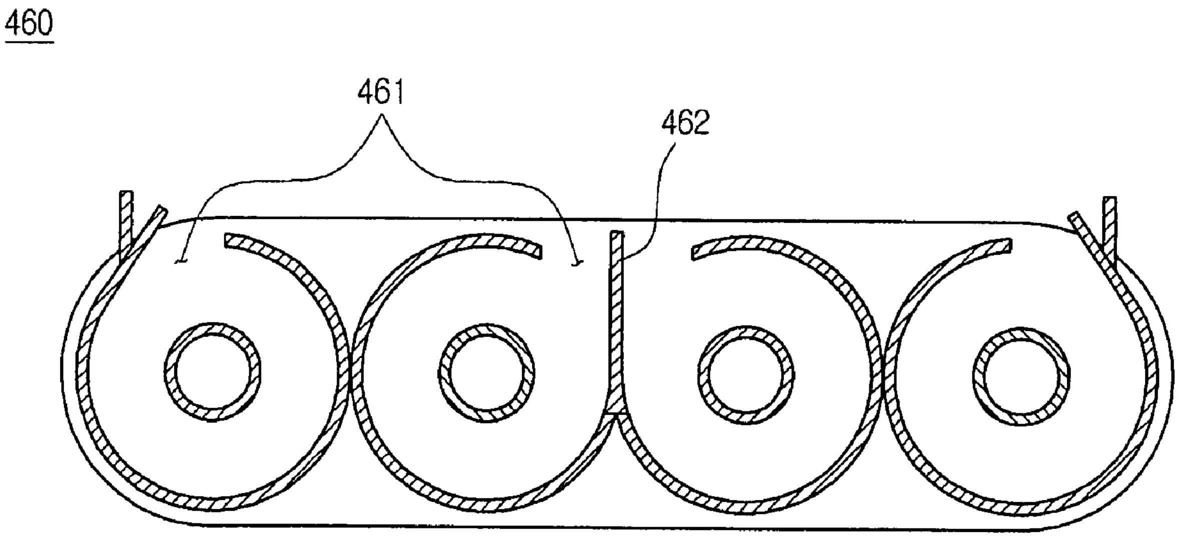
FIG. 9 is a sectional view of an alternate embodiment of the secondary cyclone unit take along line II-II' if FIG. 7.
Figure 10:
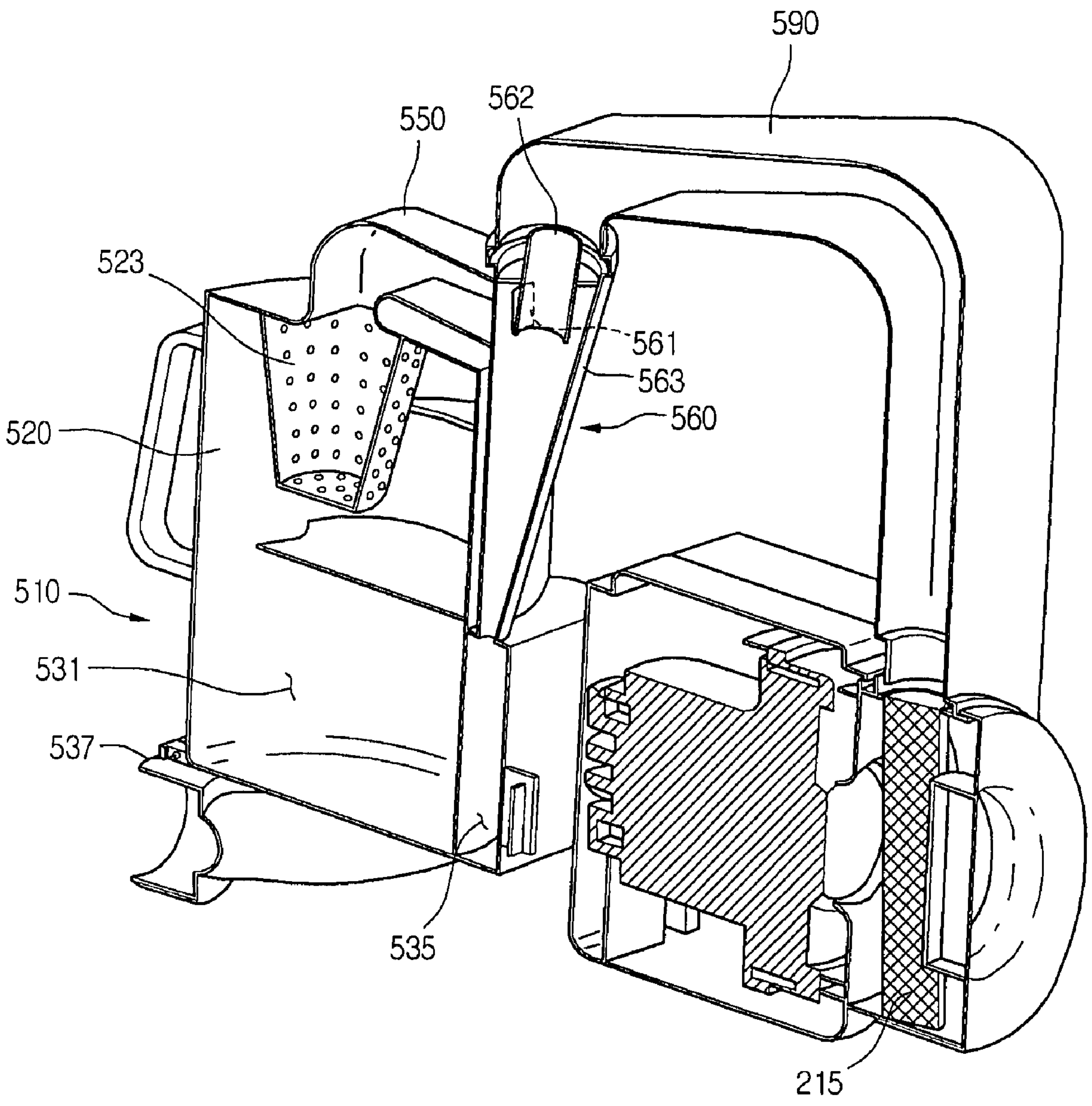
FIG. 10 is a sectional view of an other embodiment of a cyclone vacuum cleaner.

The internal configuration of the secondary cyclone unit will now be described in conjunction with FIGS. 7-9. FIG. 8 is a sectional view of a first embodiment taken along line II-II' of FIG. 7. FIG. 9 illustrates a second embodiment also taken along line II-II' of FIG. 7.

The secondary cyclone unit 360 is comprised of a plurality of small cyclones 363. In the present embodiment, four small cyclones 363 are arranged adjacent one another. However, in alternate embodiments, different numbers of small cyclones could be used. In addition, while the present embodiment shows the small cyclones being arranged adjacent one another, in alternate embodiments, multiple small cyclones could be arranged in different ways.

The air exhausted from the dust collection unit 310 is directed to the secondary cyclone unit 360 through the connection passage 350. The air passing through the connection duct 350 would be divided into two portions at the inlet of the secondary cyclone unit 360. The air would then be further divided into four portions as it passes into the small cyclones 363. The divided portions of air would then all pass through the small cyclones 363 simultaneously. Thus, the secondary cyclone unit 360 has a plurality of small cyclones 363 that are arranged in parallel.

To keep the dimensions of the secondary cyclone unit 360 as small as possible, the cyclones 363 are all arranged immediately adjacent one another. If one were to look at the longitudinal axes of the respective small cyclones 363, a distance between the axes of the respective small cyclones 363 is gradually reduced from the inlets 361 to the exhaust holes 366. Thus, the longitudinal axes of the small cyclones converge towards each other, which results in the small cyclones being arranged fanwise.

In alternate embodiments, the two central small cyclones 363 may have their respective longitudinal axes arranged parallel with each other, while the left and right small cyclones 363 may have their respective longitudinal axes converging toward each other. Of course, many other arrangements are also possible. The disposition angles of the small cyclones 363 may be determined according to their sizes, the size or volume of the sub-chamber 335 connected to the small cyclones 363, or based on other considerations.

In the embodiment shown in FIG. 7, the distances between the exterior surfaces of the small cyclones 363 gradually increases toward the chamber connection end 365. In alternate embodiments, the exterior surfaces of adjacent small cyclones 363 may contact each other throughout their length to minimize the gaps between the dust discharge holes 366. By reducing the gaps between the dust discharge holes 366 formed at an end of the sub-cyclone unit 360, the coupling portion 337 of the sub-chamber 335 can be reduced in size. As a result, the size of the sub-chamber is not unnecessarily increased.

The small cyclones can have a variety of shapes. For instance, they could be conical or cylindrical, or have other shapes. Although each small cyclone 363 may be formed in a variety of shapes, it is preferable that the small cyclones 363 are formed so that they can effectively separate the dust contained in the air using centrifugal force. In the present embodiment, the small cyclones 363 are formed as cone-shaped bodies.

Each of the small cyclones is provided with an inlet 361 through which the air is introduced. An inlet guide 362 is provided at the inlets 361 for guiding the air into the cyclones in the tangential direction. The inlet guide 362 functions to divide the inlets 361 into two sections that are surface-symmetrical. As shown in FIG. 8, the inlet guide 362 is provided at a center of the cyclones so that the left and right sides, with reference to the inlet guide 363, are symmetrical.

In order to direct the air into each of the cyclones in the tangential direction, the inlets 361 of the cyclones adjacent to the inlet guide 362 are positioned right against the inlet guide 362. The inlets 361 of the cyclones disposed at the side edges are positioned so that they open toward the inlet guide 362.

The inlet guide 362 may extend inside of the connection duct 350. In this embodiment, since the inlet guide 362 is disposed at the center of the cyclone inlets 361, the inside of the connection duct 350 is divided into left and right sections.

Generally, an amount of air flowing through the central portion of the secondary cyclone unit 360 is greater than an amount of air flowing through side edges of the secondary cyclone unit 360. Because the inlet guide 362 extends inside of the connection duct 350, the flow of the air within the connection duct 350 is divided into left and right flows. This helps to ensure that the flows entering the cyclones are more uniform, and less concentrated at the center.

Because the portion of the inlet guide 362 which is disposed inside of the connection duct 350 functions to divide the inside passage of the connection duct 350 into two passages, the inlet guide 362 may be called a partition. Although in this embodiment the inlet guide 362 is designed to divide the inside of the connection duct 350 into two sections, the invention is not limited to this.

FIG. 9 shows an alternate embodiment for the secondary cyclone unit. As in the foregoing embodiment, the inlet guide 462 is disposed to divide the inlet area into two sections. The cyclone inlets 461 adjacent to the guide 462 are still positioned immediately adjacent to the inlet guide 462. However, the cyclone inlets for the cyclones at the side edges open at their outer portions. This arrangement would also act to ensure that the air is introduced into the cyclones in the tangential directions.

The operation of the above-describe air cleaner will now be described.

First, when electric power is applied to the driving unit 210 of the vacuum cleaner 100, suction is generated by the driving unit 210 and thus air containing dust is sucked into the suction nozzle by the generated suction. The air introduced into the suction nozzle is directed into the main cyclone unit 320 through the main sucking portion 220 and the first sucking portion 321 located on the side of the dust collection unit 310. The air sucked through the first sucking portion 321 is guided into the main cyclone unit 320 in a tangential direction, along the inner wall of the main cyclone unit 320, to form a spiral current. As a result, the dust contained in the air is separated by a centrifugal force difference between the dust and the air.

The separated dust falls through the opening 329 in the scattering prevention plate 327, and it is collected in the main dust collection chamber 331. The scattering of the dust collected in the main chamber 331 can be prevented by the scattering preventing plate 327.

The air then moves upward and passes through the exhaust member 323 and the first exhaust portion 342. The air is then directed into the secondary cyclone unit 360 via the connection duct 350. As described above, the air flowing along the connection duct 350 is directed toward inner walls of the small cyclones 363 in tangential directions. Dust is further separated from the air in the small cyclones 363 by the centrifugal force. The dust separated in the small cyclones is discharged through the dust discharge holes 366 into the sub-chamber 335.

The air within the small cyclones is then directed through a discharge portion 367 into a discharge duct 390, as shown in FIG. 3. The air directed in the discharge duct 390 is directed toward the driving unit 210. The air may pass through a motor pre-filter 215, as shown in the embodiment in FIG. 3B. The air is then discharged from the main body unit 200 through the discharge duct 290.

Another alternate embodiment is shown in the cross-sectional view of FIG. 8. This embodiment is similar to the ones described above, however, the secondary cyclone unit is constructed in an entirely different manner in this embodiment.

In this embodiment, the secondary cyclone unit 560 is not horizontally disposed on the main body unit 200. Instead, the secondary cyclone unit 560 is attached to a connection duct 590, and the cyclone itself is oriented at a relatively steep angle. As a result, the discharge end of the cyclone 563 empties dust directed into a sub-chamber 535 formed on an exterior of the dust collection unit 510.

Also, in this embodiment, a bottom of the dust collection unit is configured to be opened so that collected dust can be easily removed. The bottom surface of the main dust collection chamber 531 would be hinged to the upper portion of the dust collection unit by a hinge portion 537 formed on a first lower side of the dust collection unit 510.

In this embodiment, when the driving unit is driven, air containing dust is introduced into the suction nozzle. The air would first pass thorough the main cyclone unit 520, where dust would be separated from the air. The separated dust would moves downward to be stored in the main dust collection chamber 531.

The air would then pass through the discharge member 523 and into the connection passage 550. The air would then be guided to the inner wall of the small cyclone of the secondary cyclone unit 560 in the tangential direction through an inlet 561. Additional dust particles would be separated from the air in the secondary cyclone unit 560, and the separated dust would be stored in the sub-chamber 535 connected to an end of the secondary cyclone unit 560.

The air would exit the secondary cyclone unit 560 via a discharge portion 562, and the air would be directed through a discharge duct 590. Any additional fine dust particles contained in the air being directed through the discharge duct 590 would be separated from the air by the motor pre-filter 215. The air would then be exhausted from the main body of the vacuum cleaner.

Figure 11:
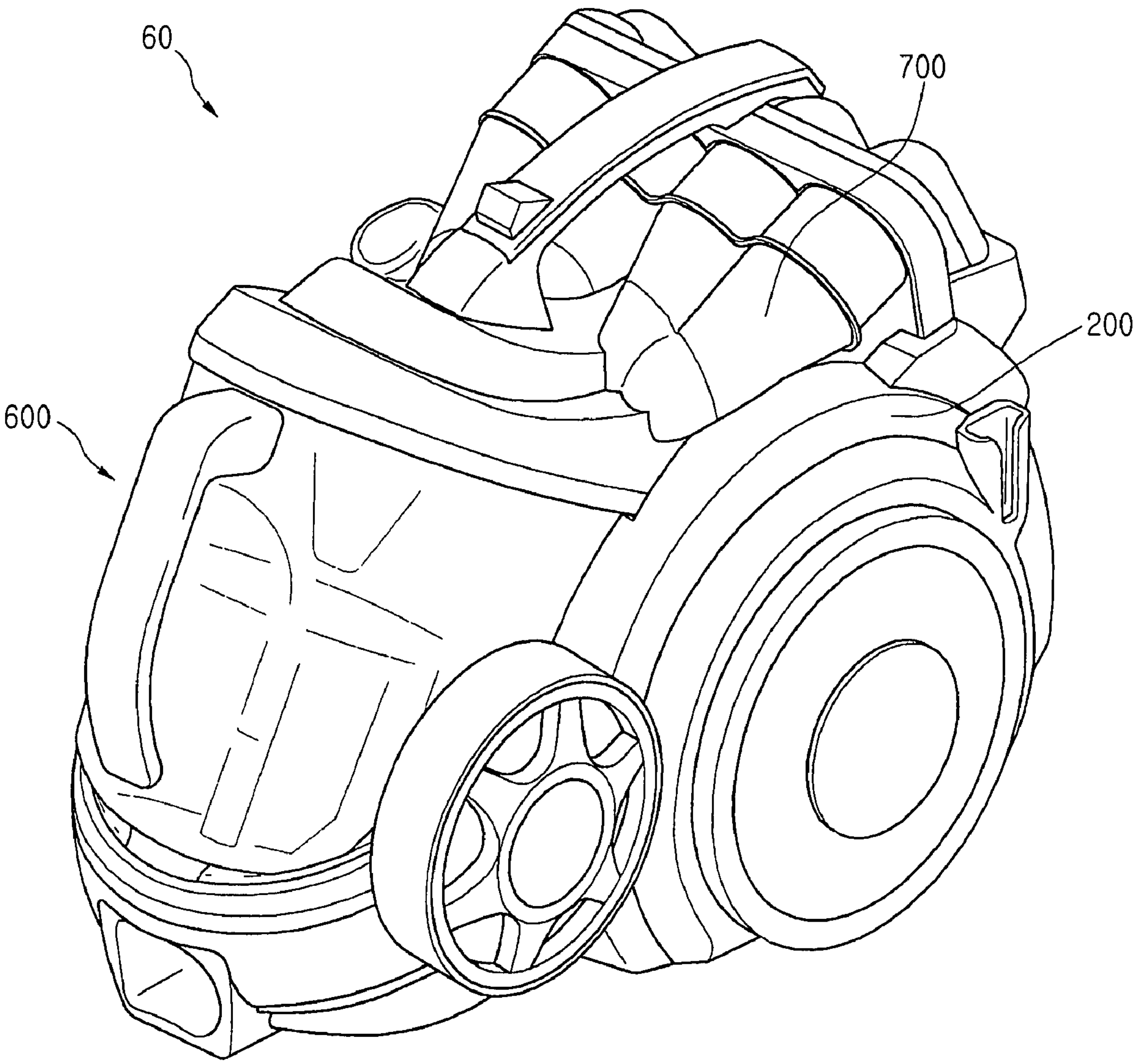
FIG. 11 is a perspective view of another embodiment of a vacuum cleaner.
Figure 12:
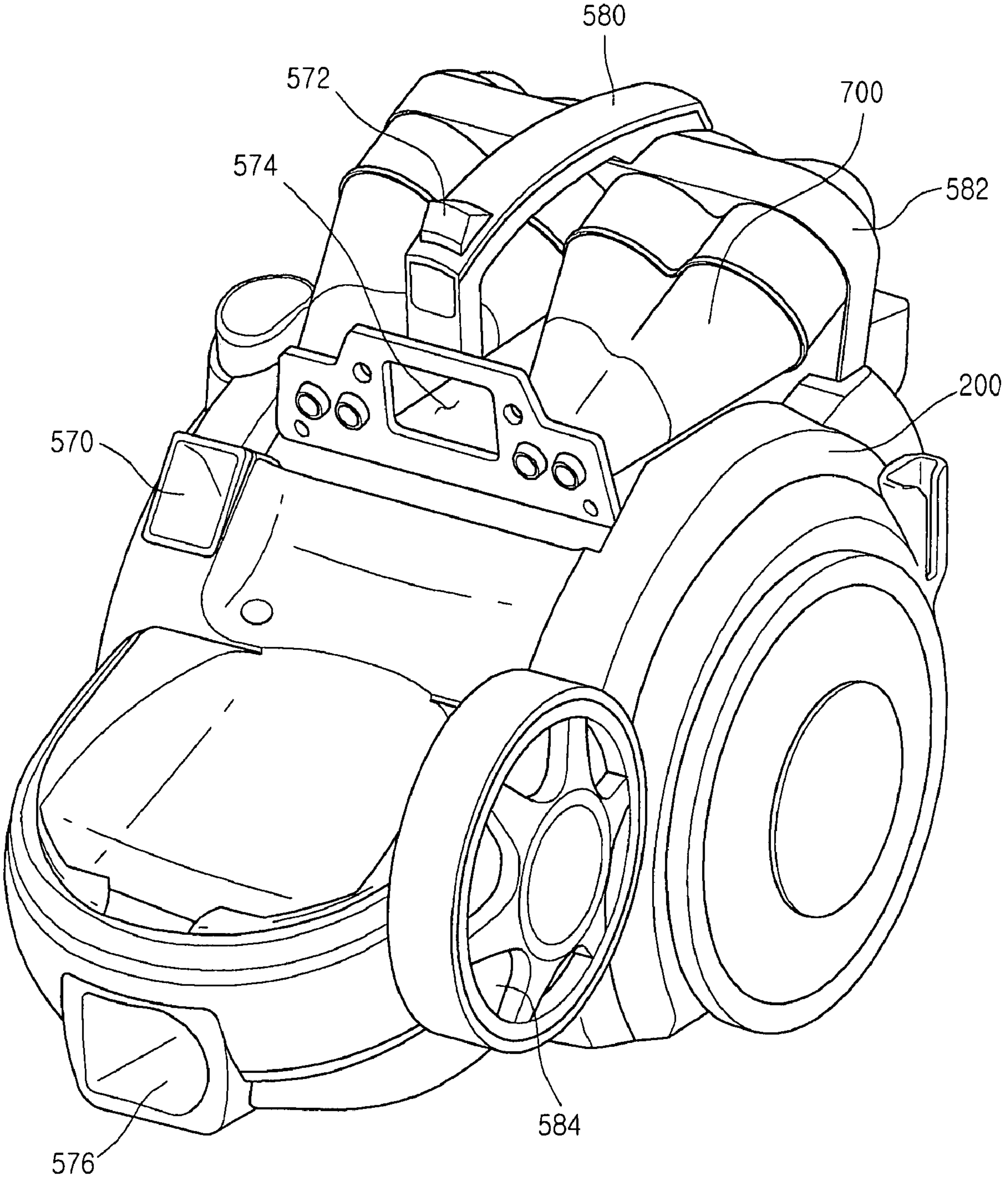
FIG. 12 is a perspective view of the vacuum cleaner of FIG. 11 with the dust collection unit removed.

FIG. 11 is a perspective view of another embodiment of a vacuum cleaner. FIG. 2 is a perspective view of the vacuum cleaner FIG. 1, after a dust collection unit has been separated from the vacuum cleaner. FIG. 3 is a perspective view of the dust collection unit of this embodiment.

The vacuum cleaner 10 includes a main body 200 and a dust separation device for separating the dust contained in the air sucked into the main body 200.

In this embodiment, a nozzle would be attached to a hose, and the hose would be inserted into main air inlet 576. Air with dust particles would be introduced into the vacuum cleaner via the main air inlet 576. As the air passes through the vacuum cleaner, dust particles would be removed from the air. The air would then be discharged from a main body discharge unit 582 formed on a side surface of the main body 200. A main body handle 580 would be formed on an upper portion of the main body 200.

As in the embodiments described above, this embodiment would make use of both a main dust separation unit and a secondary dust separation unit. The main dust separation unit would be located in the removable dust collection unit 600, and the secondary dust separation unit would be located on the main body 200. This means that the present embodiment would have the advantages described above. Specifically, the removable dust collection unit 600 would remain small and lightweight because the secondary dust collection unit is mounted on the main body. In addition, because no the space within the removable dust collection unit 600 is taken up by the secondary dust separation unit, there is more room for storing the separated dust.

The dust collection unit 600 is detachably mounted on a front portion of the main body 200. A mounting/dismounting lever 572 is provided on the handle 580 of the main body 200 and a hooking end 656 that interlocks with the mounting/dismounting lever 572 is formed on the dust collection unit 600.

The dust collection unit 600 includes a main cyclone unit 630 for separating dust from the incoming air. The separated dust would be stored in a main dust storing portion 610. When the dust collection unit 600 is mounted on the main body 200, it would communicate with a secondary cyclone unit 700 mounted on the main body 200. This would allow dust separated in the secondary cyclone unit 700 to be stored in the removable dust collection unit 600.

The main body 200 is provided with an air discharge hole 570 for discharging the air sucked into the main body 200 via the main air inlet 576. The air would exit the discharge hole 570 and enter the dust collection unit 200 via a first intake hole 612. The air entering the intake hole would be traveling in a tangential direction relative to the interior cylindrical surface of the main cyclone unit 630 so as to generate a cyclone current in the dust collection unit 200.

As mentioned above, the air entering the main cyclone unit would lose some of the dust particles due to the cyclone action of the air. The air would then exit the main cyclone unit via a first discharge hole 652. The main body 200 is provided with a connection passage 574 for guiding the air discharged through the first discharge hole 652 to the secondary cyclone unit 700.

In this embodiment, the secondary cyclone unit 700 includes a plurality of small cyclones that are cone-shaped. However, many other shapes for the small cyclones are also possible. The secondary cyclone unit 700 is substantially horizontally arranged on a rear-upper portion of the main body 200. Because the secondary cyclone unit 700 is provided on the main body 200, instead of within the dust collection unit 600, the structure of the dust collection unit 600 is simplified and lightweight. Therefore, the user can easily handle the dust collection unit 600 when removing it to empty collected dust.

As mentioned above, in this embodiment, the dust separated by the secondary cyclone unit 700 is stored in the dust collection unit 600. To move the separated dust particles from the secondary cyclone unit 700 to the dust collection unit, the dust collection unit 600 is provided with dust inlet holes 654. Dust separated by the secondary cyclone unit 700 passes through the dust inlet holes 654 and is stored in a secondary dust storage compartment 616. In this embodiment, although the secondary cyclone unit 700 is separated from the dust collection unit 600 and provided on the main body 200, the dust separated in the secondary cyclone unit 700 can be stored in the dust collection unit 600.

Figure 13:
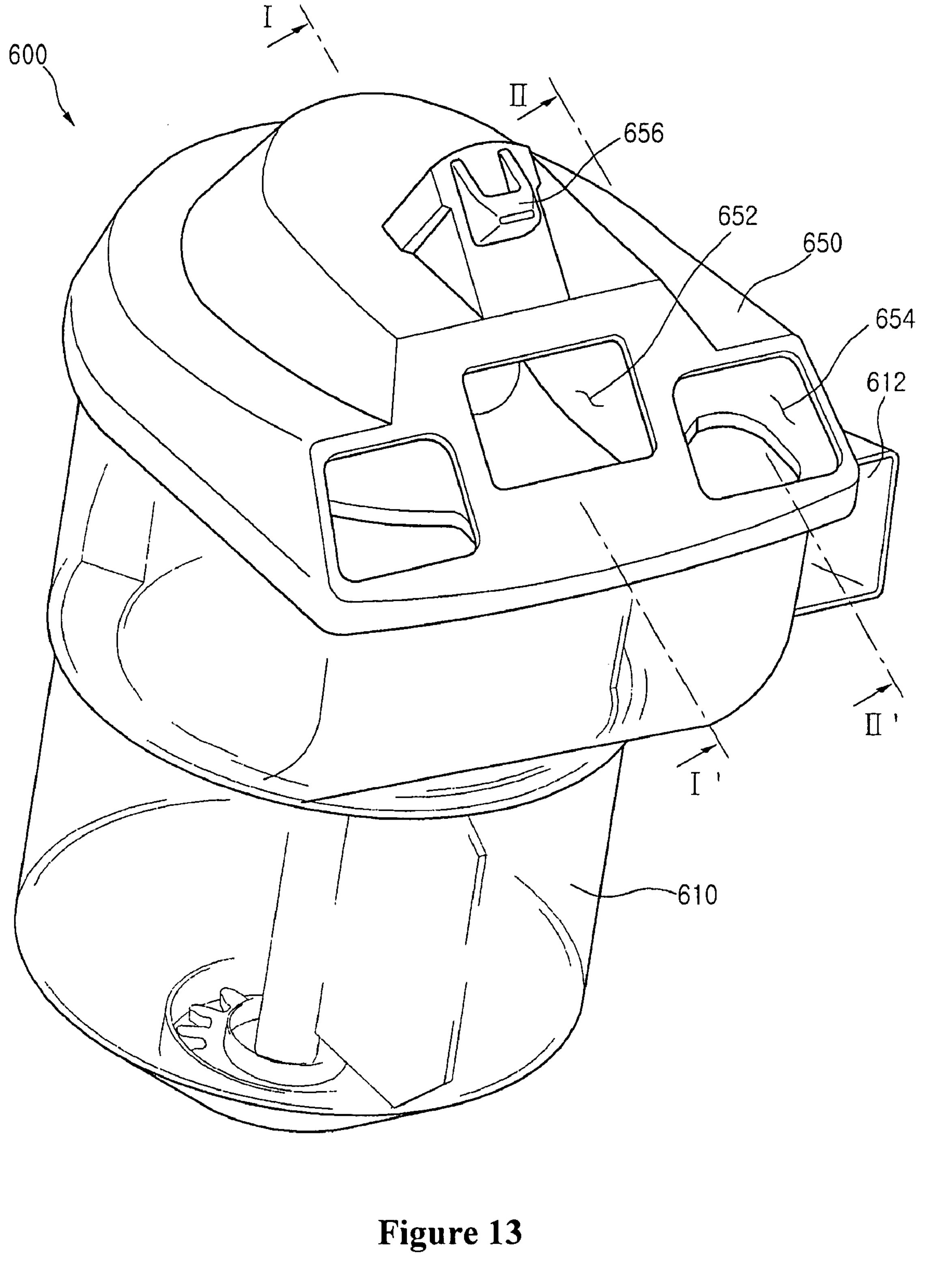
FIG. 13 is a perspective view of the dust collection unit of the vacuum cleaner shown in FIG. 11.
Figure 14:
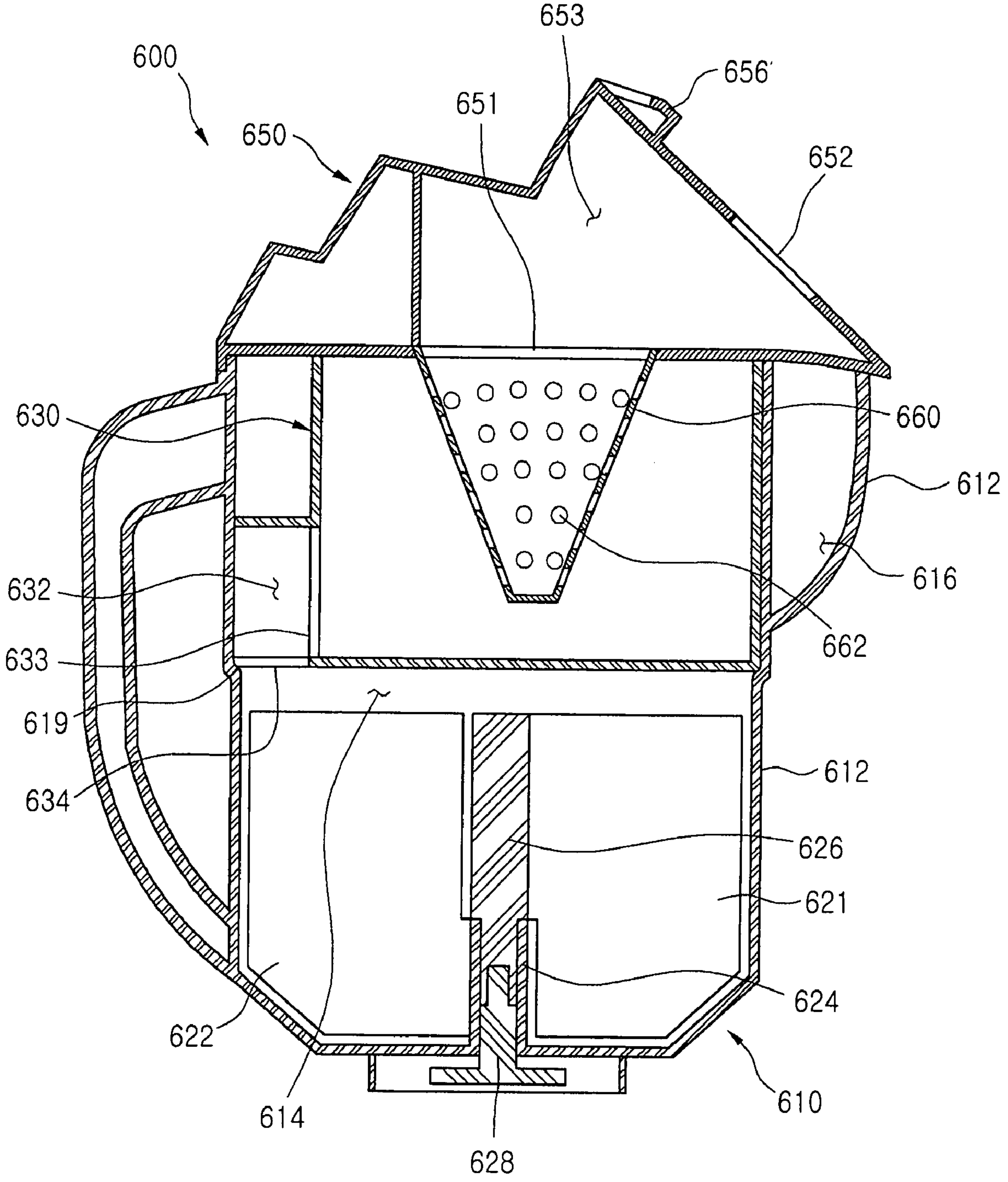
FIG. 14 is a cross-sectional view of the dust collection unit of FIG. 13 taken along line I-I'.

The following will describe the dust collection unit 600 in more detail. FIG. 14 is a sectional view taken along line I-I' of FIG. 13 and FIG. 15 is a sectional view taken along line II-II' of FIG. 13.

Figure 15:
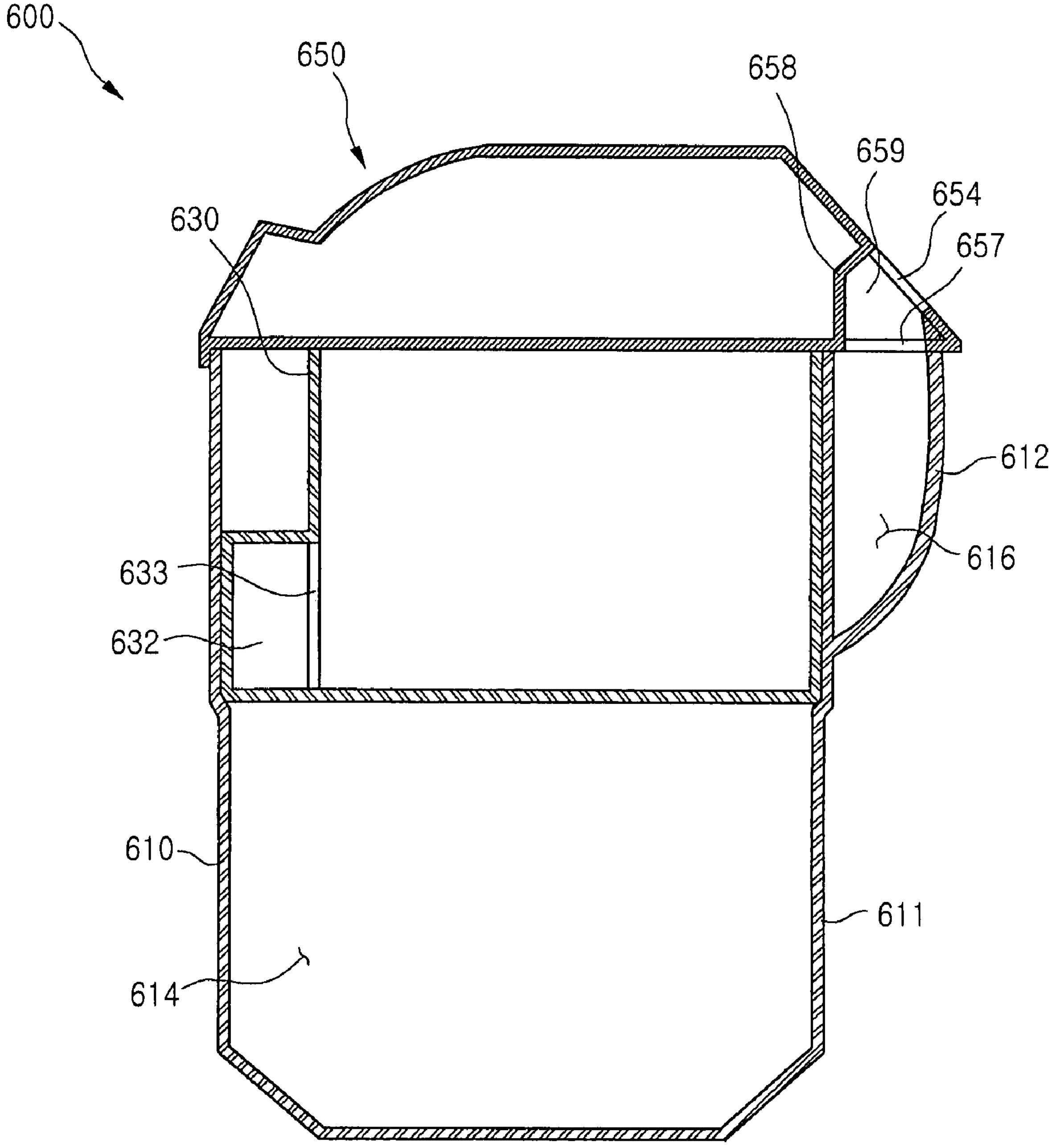
FIG. 15 is a cross-sectional view of the dust collection unit of FIG. 13 taken along line II-II'.
Figure 16:
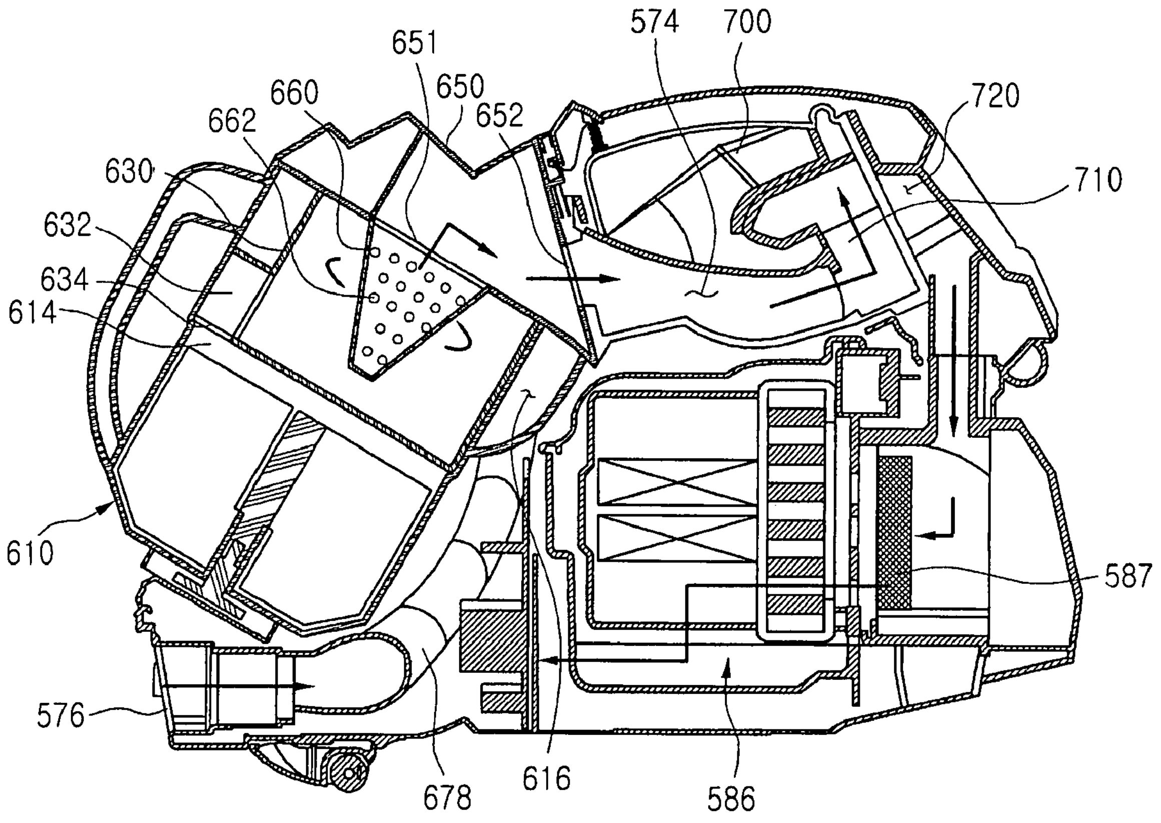
FIG. 16 is a cross-sectional view of the vacuum cleaner of FIG. 11.

Referring to FIGS. 14 and 15, the dust collection unit 600 includes a dust collection body 610, a main cyclone unit 630 and a cover member 650 for selectively opening and closing an upper portion of the dust collection body 610. The dust collection body 610 is formed in a cylindrical-shape and defines a main dust storing chamber 614 for storing dust separated in the main cyclone unit 630. A secondary dust storing chamber 616 for storing dust separated by the secondary cyclone unit 700 is formed on an upper side of the dust collection body 610.

The dust collection body 610 includes a first wall 611 forming the main dust storing chamber 214 and a second wall 612 for forming the secondary dust storing chamber 616. That is, the second wall 612 is designed to enclose a portion of the second wall 611. Accordingly, the secondary dust storing chamber 616 is formed at an outer side of the main dust storing chamber 614. Because the secondary dust storing chamber is formed at an outer side of the main dust storing chamber 614, the size of the main dust storing chamber 614 can be maximized to increase its dust collection volume.

The first wall 611 is provided with a circumferential step 619 for supporting a lower end of the main cyclone unit 630 received therein.

In this embodiment, a pair of pressing plates 621 and 622 is provided in the dust collection body 610 to reduce the volume of the dust stored in the main dust storing chamber 614, and thus increase the amount of dust that can be collected before it is necessary to empty the duct collection unit. The pair of pressing plates 621 and 622 move towards each other to compress the dust between the plates, and thereby reduce the volume of the dust. When this occurs, the density of the dust stored in the main dust storing chamber 614 increases.

A first pressing plate 622 may be a stationery plate fixed on a fixing shaft 624 which is itself mounted on a bottom of the dust collection body 610. A second pressing plate 621 may be a rotational plate fixed on a rotational shaft coupled to the fixing shaft 624. A driven gear 628 is coupled to the rotational shaft 626, and the driven gear 628 is rotated by a driving unit. For instance, the main body 200 may be provided with a driving gear which is engaged with the driven gear 628 when the dust collection body is mounted on the main body 200. A motor would then rotate the driving gear, and the driving gear would rotate the driven gear 628.

With this type of an arrangement, when the motor is driven, the driving gear and the driven gear 228 would rotate to rotate the rotational plate 621. The rotational plate 621 could be rotated in two directions so as to compress the dust located on both sides of the stationery plate 622. Accordingly, the driving motor may be a synchronous motor.

In the present embodiment, although only one of the pressing plates 621 and 622 is movable, the present invention is not limited to this embodiment. For example, both of the pressing plates 621 and 622 may be movable in the dust collection body 210. Further, although in this embodiment the pressing plates press the collected dust between themselves, in other embodiments the pressing plates could press the dust against other features within the dust collection body. Also, in other embodiment, only a single pressing plate could be used, or more than two pressing plates could be used.

The dust collection body 610 is opened at its upper portion so that the user can discharge the dust by turning the same over. The cover member 650 is detachably coupled to the upper portion of the dust collection body 610. Note that the cover member 650 simultaneously opens and closes both the main and secondary dust storage chambers 614 and 616. To allow the dust to be emptied from the dust collection body 610, the main cyclone unit 630 is separated from the interior of the dust collection body 610 together with the cover member 650. Therefore, the main cyclone unit 630 is coupled to a lower portion of the cover member 650.

Although this embodiment has the main cyclone unit 630 coupled to the cover member 650, the present invention is not limited to this embodiment. For example, the main cyclone unit 630 may be integrally formed with the cover member 650, or it could be a completely separate unit that is also removable.

A dust guide passage 632 is formed in the main cyclone unit 630 to effectively discharge the dust to the main dust storage unit 614. The dust guide passage 632 allows the air circulating in the main cyclone unit to be sucked in the tangential direction and directed downward. Therefore, an inlet 633 of the dust guide passage 632 is formed on a side surface of the main cyclone unit 630, and an outlet 634 of the dust guide passage 632 is formed on a bottom of the main cyclone unit 630.

The cover member 650 is provided at a bottom with an air discharge hole 651, through which the air is discharged. An upper portion of a filter member 660 provided with a plurality of holes 662 is coupled to an outer circumference of the air discharge hole 651. Accordingly, air is discharged through the air discharge hole 651 via the filter member 660.

In addition, a passage 653 for guiding the air to the first discharge hole 652 is formed in the cover member 650. That is, the passage 653 functions as a passage for connecting the discharge hole 651 to the first discharge hole 652.

In addition, as shown in FIG. 15, the cover member 650 is provided with two dust inlet holes 654, through which the dust separated in the secondary cyclone unit 700 is introduced. The dust inlet holes 654 are formed on opposite sides of the outlet 652. Also, a dust discharge hole 657 formed on the bottom of the cover 650 leads down into the secondary dust storage chamber 616. A space is defined between the dust inlet hole 654 and the dust discharge hole 657. A guide rib 658 is provided to allow the dust entering the dust inlet hole 654 to be effectively moved to the secondary dust storage chamber 616 through the dust discharge hole 657. The guide rib 658 helps to prevent the dust introduced into the dust inlet hole 654 from accumulating in the cover member 650.

As described above, the main cyclone unit 630 is provided in the dust collection unit 600 and the secondary cyclone unit 700 is provided in the main body 200. However, the vacuum cleaner may further include a third cyclone unit. In this case, the third cyclone unit would also be provided in the main body 200. In yet other embodiments, main and secondary cyclones units may be provided in the dust collection unit 600, while a third cyclone unit is provided in the main body 200. In a vacuum cleaner embodying the invention, one or more of the cyclone units would be mounted on the main body so that the dust collection unit can remain small and lightweight.

In addition, although in the present embodiment the dust separation units are cyclone units, the present invention is not limited to this. For example, a dust separation unit that can separate the dusts using a gravity difference, a physical filter, or some other mechanism may be used. Regardless, the vacuum cleaner would include more than one dust separation unit, and at least one of the dust separation units would provided in the dust collection unit and at least one of the dust separation units would be provided in the main body.

A description of how the vacuum cleaner operates will now be provided in conjunction with FIG. 6, which is a sectional view of the vacuum cleaner.

When electric power is applied to the vacuum motor 586 of the vacuum cleaner, suction is generated by the vacuum motor 586 and air containing dust is sucked into the suction nozzle by the generated suction. The air sucked through the suction nozzle is directed into the main body 200 through the main inlet 576 and is then directed to the dust collection unit 600 through a communication passage 678.

The air enters the main cyclone unit 630 in a tangential direction via the inlet hole 612 of the dust collection body 610. The air rotates downward along the inner circumference of the main cyclone unit 630, in the course of which the air and dust are separated by the centrifugal force. The air then passes through the filter member 660, which also serves to filter out larger dust particles. Then, the air is discharged out of the dust collection unit 600 through the first discharge hole 652.

Meanwhile, the dust separated in the main cyclone unit 630 is introduced into the dust guide passage 632 while rotating along the bottom inner circumference of the main cyclone unit 630. The dust introduced into the dust guide passage 632 changes its flow direction in the dust guide passage 632 and moves downward through the discharge hole 634 to be stored in the main dust storage chamber 614.

The air discharged through the first discharge hole 652 is introduced into a connection passage 574 in the main body 200. The connection passage 574 conveys the air to the secondary cyclone unit 700.

Figure 19:
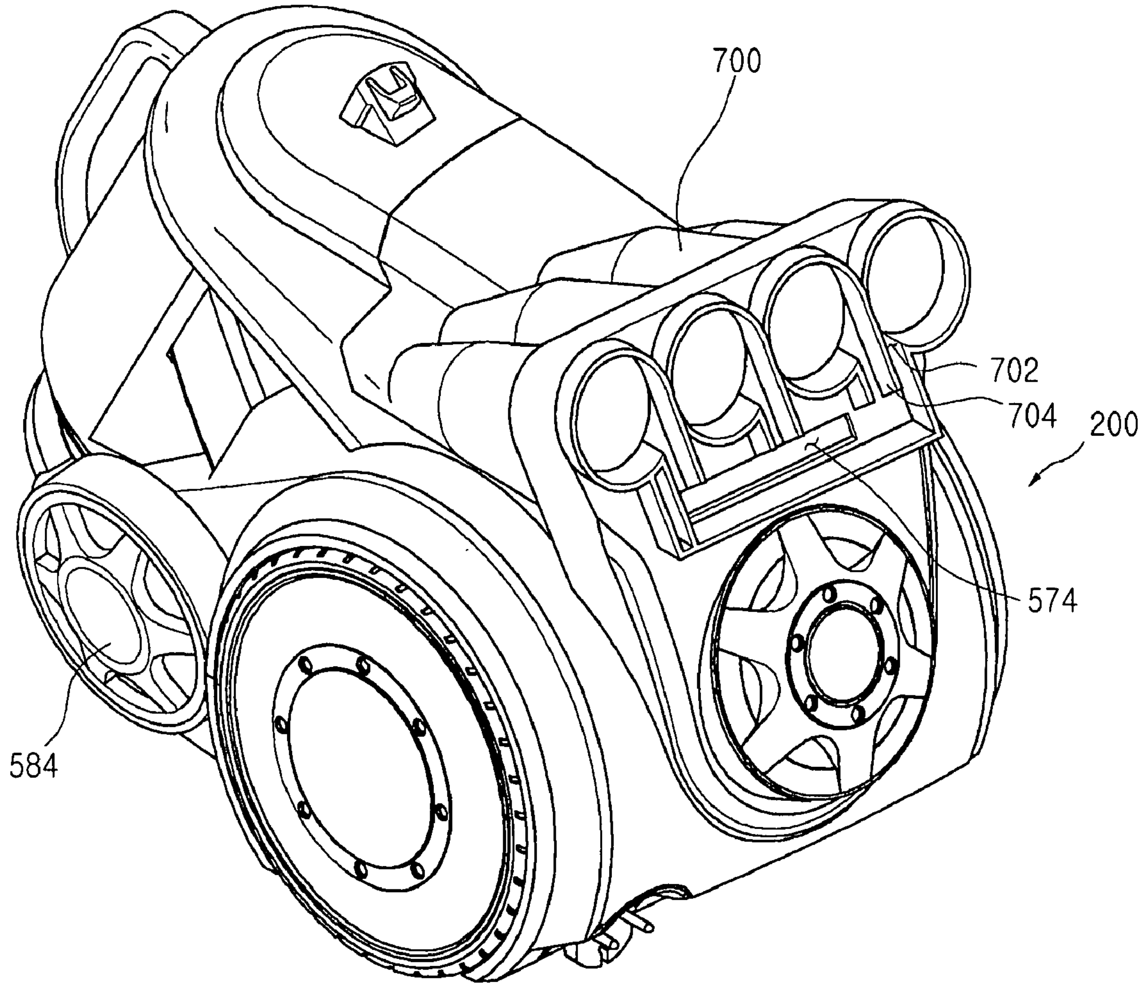
FIG. 19 is a perspective view of an embodiment of a vacuum cleaner with a duct cover removed to expose the inlets to the secondary cyclone unit.

As shown in FIG. 19, guide ribs 704 formed adjacent inlets 702 into the small cyclones ensure that air from the connection passage 574 is introduced into the cyclones in a tangential direction. Thus dust still contained in the air are further separated in the secondary cyclone unit 700.

The air exiting the secondary cyclone unit is introduced into a discharge passage 720 formed in the main body 200. The air is conveyed to the motor pre-filter 587, and is ultimately discharged from the main body via the main body discharge portion 584.

The dust separated in the secondary cyclone unit is introduced into the dust collection unit 600 through the dust inlet holes 654 formed in the cover member 650, and are ultimately stored in the secondary dust storage chamber 616.

To empty the dust collection body 610, the user first separates the dust collection unit 600 from the main body 200. Then, the user separates the cover member 650, to which the primary cyclone unit 630 is coupled, from the dust collection unit 600. The dust collection body 210 is turned over to discharge the collected dust.

Figure 17:
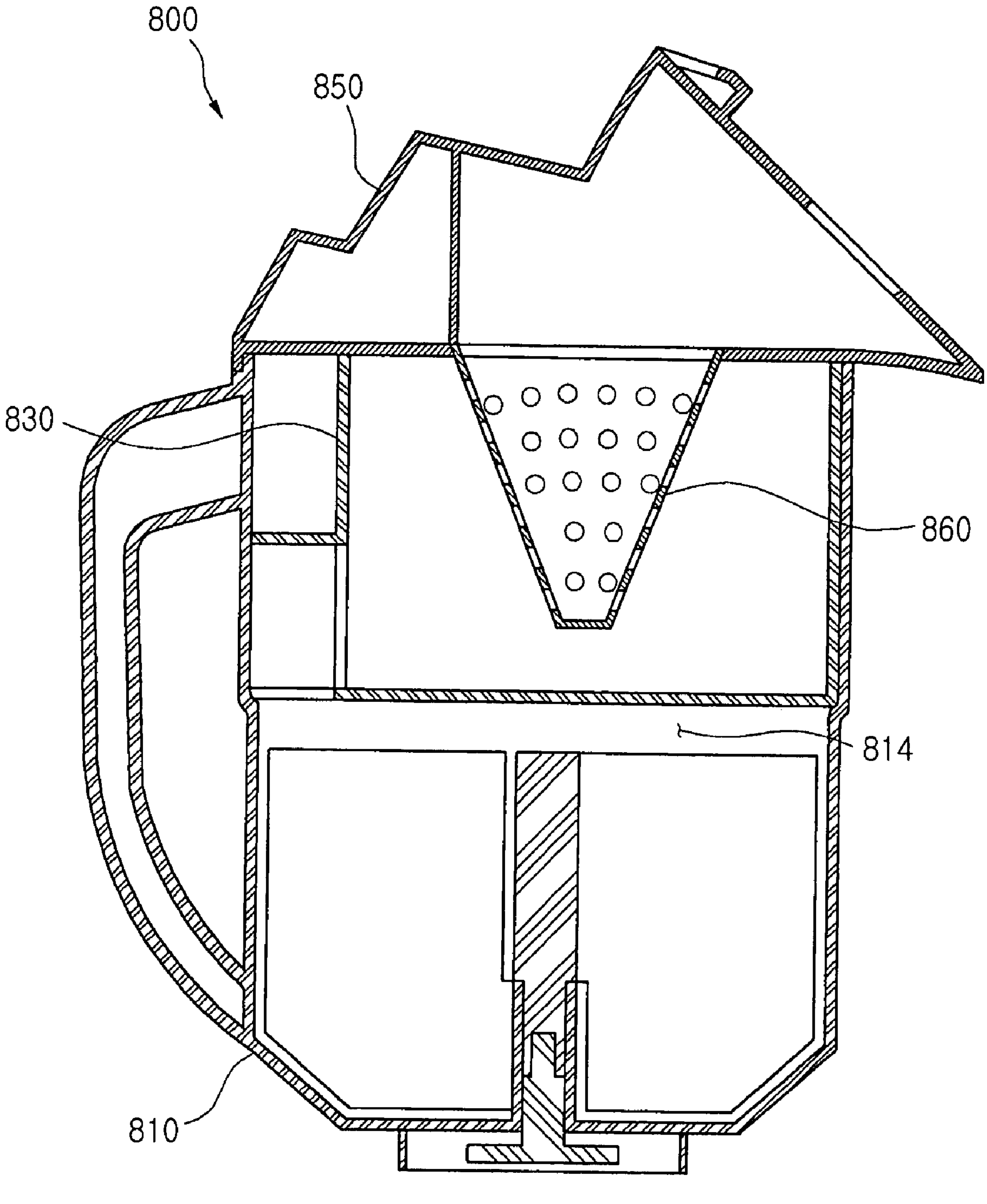
FIG. 17 is a cross-sectional view of another embodiment of a dust collection unit.
Figure 18:
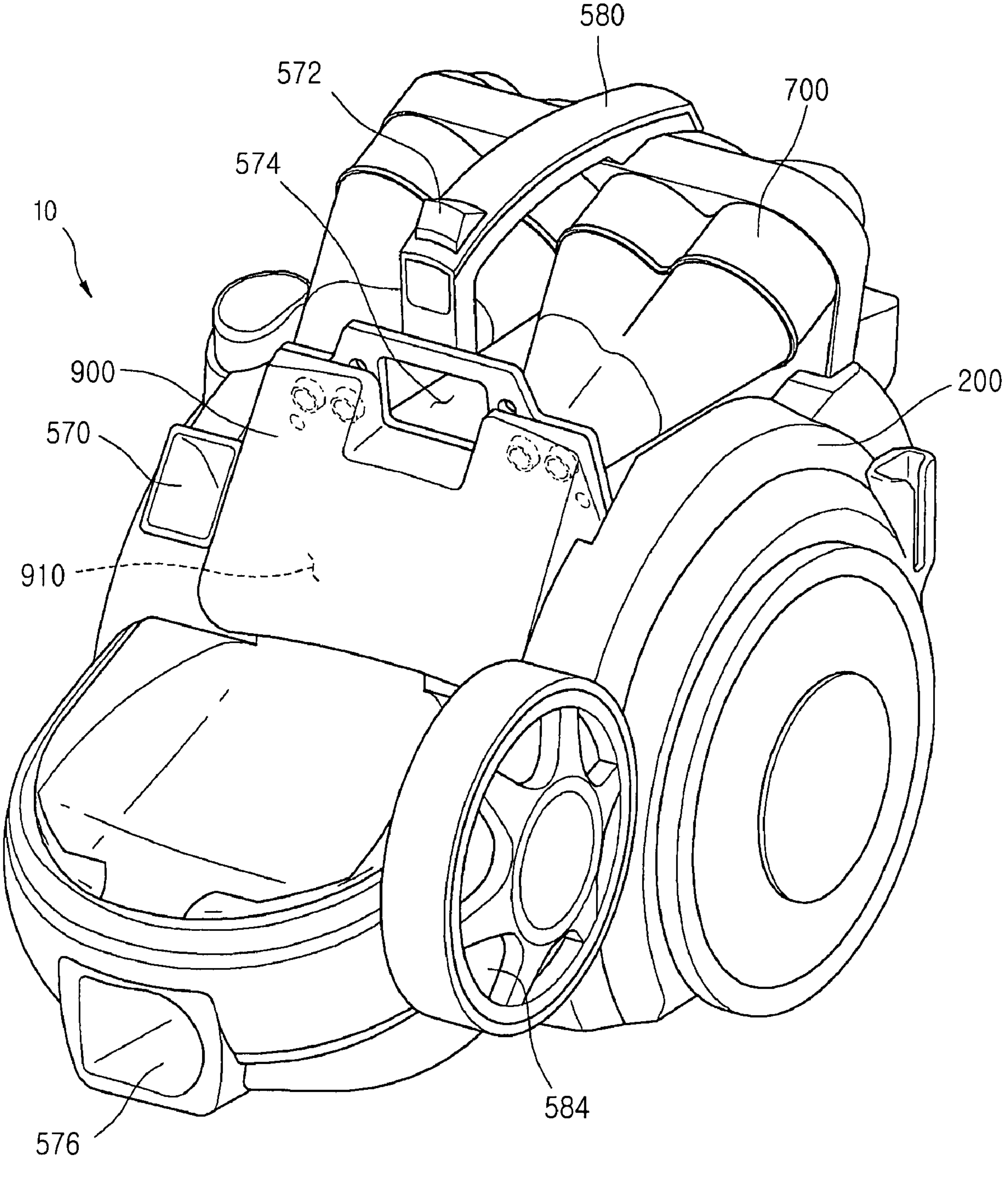
FIG. 18 is a perspective view of an embodiment of a vacuum cleaner which could use the dust collection unit of FIG. 17.

FIGS. 17 and 18 illustrate an alternate embodiment that is similar to the one described immediately above. In this alternate embodiment, however, the dust separated in the secondary cyclone unit is stored in a separate secondary storage container, as opposed to the main dust collection unit. FIG. 17 is a sectional view of a dust collection unit according to this alternate embodiment, and FIG. 18 is a perspective view of a main body of a vacuum cleaner according to this alternate embodiment.

A dust collection unit 800 of this embodiment includes a dust collection body 810 having a main dust storage chamber 814, a main cyclone unit 830 selectively received in the dust collection body 810 and a cover member 850 for selectively opening and closing an upper portion of the dust collection body 810.

A secondary dust storage chamber 910 for storing dust separated in the secondary cyclone unit 700 is mounted on the main body 200. The cyclones in the secondary cyclone unit communicate with an interior of the secondary dust storage chamber 910.

Because the main cyclone unit 830 separates relatively large-sized dust particles, while the secondary cyclone unit 700 separates fine dust particles, a much larger volume of dust will accumulate in the main dust storage chamber 814 than in the secondary dust storage chamber 910. Therefore, the main dust storage chamber would have to be emptied more frequently.

In this embodiment, because only the main dust storage chamber 814 is formed in the dust collection body 810, the structure of the dust collection body 810 is simplified and lightweight. Therefore, the user can easily handle the dust collection body 810.

Of course, the secondary dust storage chamber 910 would also be detachably mounted on the main body 200 so that it can also be emptied easily after being separated from the main body 200.

In the embodiments described above, a secondary cyclone unit is mounted on a main body of the vacuum cleaner. The cyclone units tend to generate a relatively large amount of noise in operation. For this reason, in some embodiments, a cover may be mounted over the secondary cyclone units to reduce the amount of noise produced by the vacuum cleaner.

Figure 20:
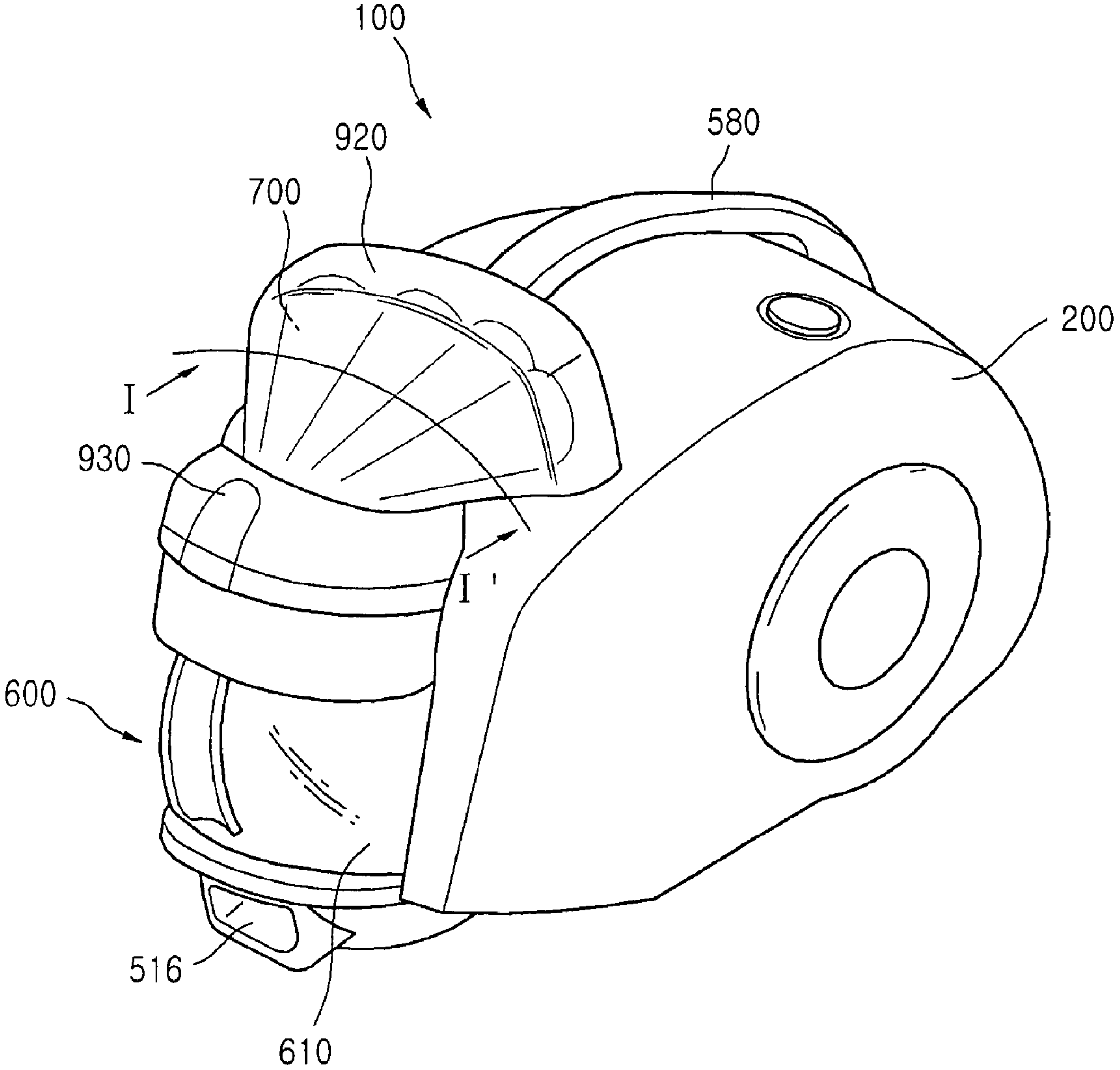
FIG. 20 is a perspective view of an embodiment with a cover over the secondary cyclone unit.

FIG. 20 shows an embodiment where a cover 920 is mounted over the secondary cyclone unit 700 of a vacuum cleaner. The cover 920 at least partly encloses an outer circumference of the secondary cyclone unit 700.

The cover 920 may be detachably provided on the main body 200. To achieve this, the cover 920 may be provided with a coupling hook and the main body 200 would be provided with a hook coupling portion interlocked with the coupling hook. However, the present invention is not limited to this. The cover could be mounted in various other ways. Also, the cover could be mounted so that it is not intended to be removed.

The cover 920 may be formed of a transparent material so that the user can see the dust separation process in the secondary cyclone separation unit 700. In this instance, the secondary cyclone separation unit 700 would also be formed of a transparent material.

Figure 21:
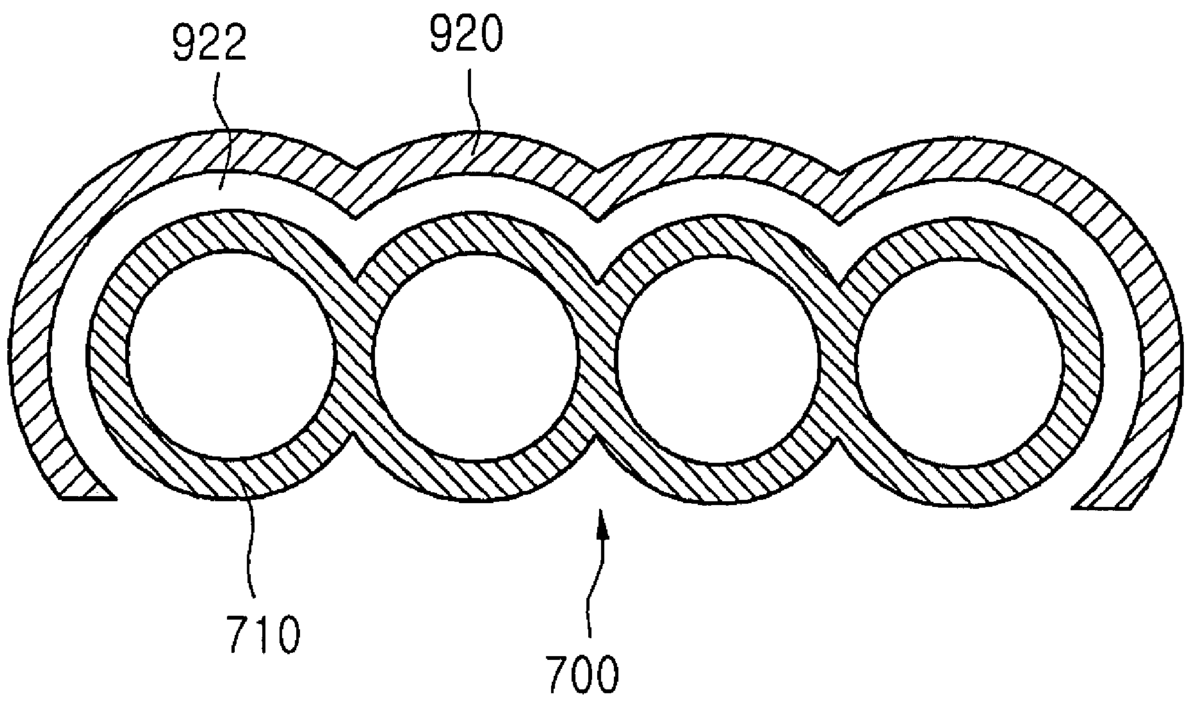
FIG. 21 is a cross-sectional view of the secondary cyclone unit and the cover taken along line I-I' of FIG. 20.

As shown in FIG. 21, which is a cross-sectional view taken along line I-I' of FIG. 20, the secondary cyclone unit 700 includes a plurality of small cyclones 710 arranged substantially in parallel. In FIG. 21, although four small cyclones 710 are provided, the present invention is not limited to this. The secondary cyclone unit might have any number of small cyclones.

Figure 22:
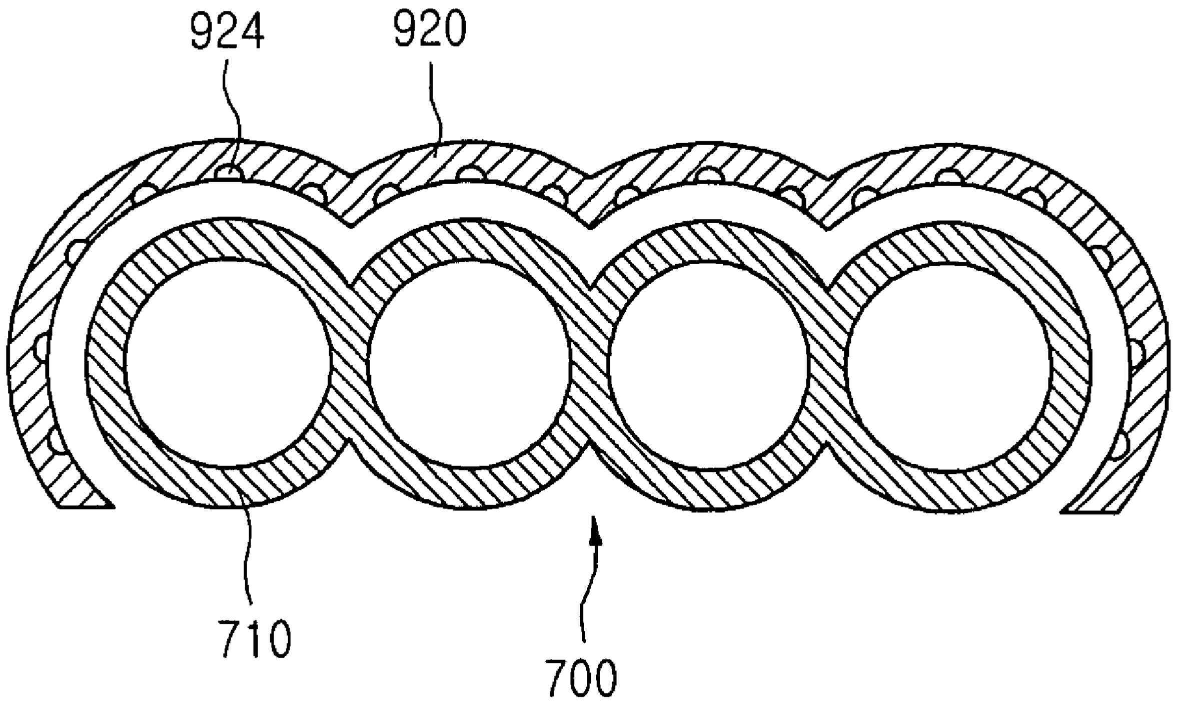
FIG. 22 is a cross-sectional view of the secondary cyclone unit and the cover of another embodiment also taken along line I-I' of FIG. 20.
Figure 23:
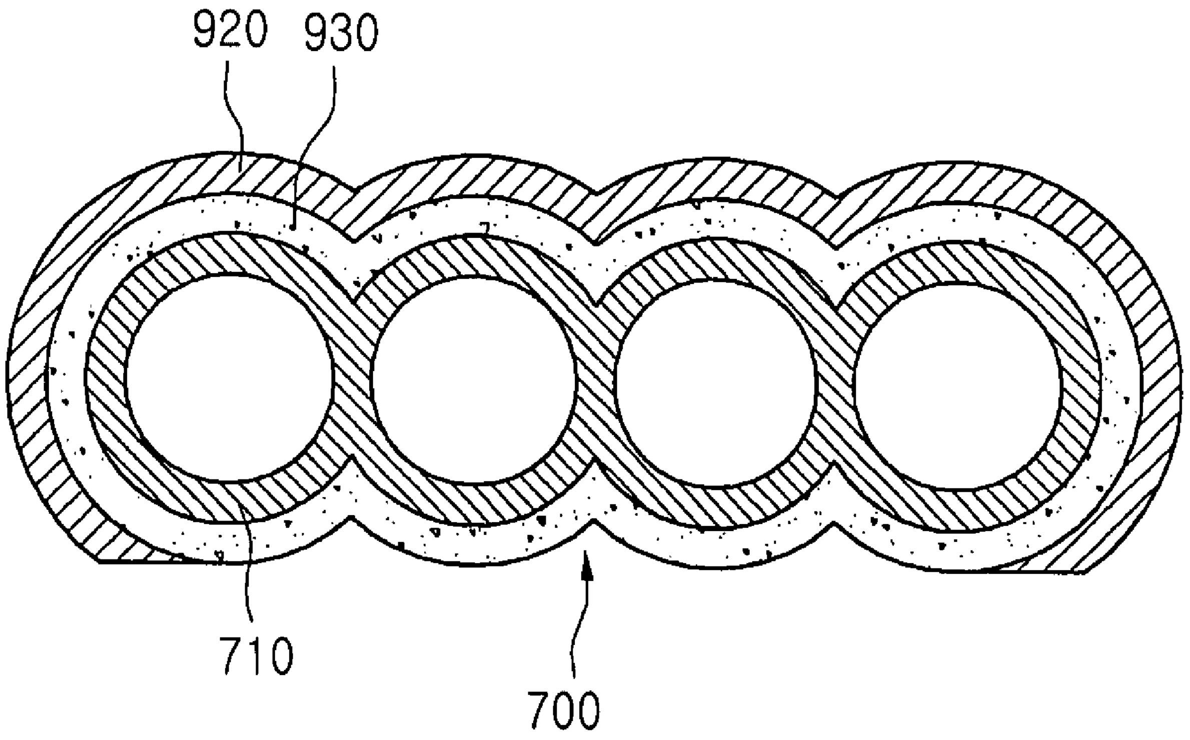
FIG. 23 is a cross-sectional view of the secondary cyclone unit and the cover of yet another embodiment also taken along line I-I' of FIG. 20.

In the embodiments shown in FIGS. 21-23, the cover 920 is formed in a shape corresponding to the exterior surfaces of the secondary cyclone unit 700. Accordingly, the portion of the cover 920, which encloses the secondary cyclone unit 700, defines a portion of an outer surface of the main body 200.

Because the cover 920 is formed in a shape corresponding to the cyclone unit 700, the outer appearance of the cleaner can be improved. Although in the embodiments shown in FIG. 21-23 the cover member 920 is formed in a shape corresponding to the cyclone unit 700, the present invention is not limited to this embodiment. The cover member may be formed in a variety of shapes.

Therefore, the vibration and noise generated during the dust separation process in the secondary cyclone unit 300 can be interrupted or attenuated by the cover member 920. A predetermined space 922 may be formed between the cover 920 and the cyclone unit 700 to more effectively intercept or attenuate the noise and vibration generated from the cyclone unit 700.

It is believed that the noise generated from the cyclone unit 700 is primarily intercepted by the space 922, and secondarily intercepted by the cover member itself 920. Therefore, by providing the air gap between the cyclone unit and the cover, the noise intercepting or attenuating effect can be enhanced.

Although the embodiment in FIGS. 21 and 22 show the cover member 920 spaced apart from the cyclone unit 700, the present invention is not limited to this. That is, the cover 920 may closely contact the cyclone separation unit 300. In this case, the vibration reduction may be further improved.

FIG. 22 is a sectional view taken along line I-I' according to another embodiment. In this embodiment, a cover 920 encloses the cyclone unit 300 such that the cover is spaced apart from the cyclone unit 300. The cover 920 is provided at an inner surface with a plurality of noise reduction indentations 924. The indentations or depressions 924 help to reduce the noise generated during the dust separation process in the cyclone unit 700.

It is believed that sounds waves emanating from the cyclone unit will collide with the interior surface of the cover 920 and bounce back towards the cyclone unit 700. When sounds waves generated by the cyclone unit 300 are directed to the noise reduction indentions or depressions 924, the sound waves may be better reflected back towards the interior of the cover, or at least dissipated better than if the depressions or indentations 924 were not present. Therefore, the noise reduction effect can be enhanced.

The indentions or depressions 924 could take many different forms. They could be formed as small dimples such as the dimples on a golf ball. Alternatively, they could have other shapes which include grooves which run along the interior surface of the cover.

In an embodiment like the one shown in FIG. 22, the noise is primarily reduced by the space 922 defined between the cover 920 and the cyclone unit 700 and secondarily reduced by the noise reduction indentations or depressions 924. Then, the noise is thirdly reduced by the cover 920. Therefore, the noise reduction effect can be further enhanced.

FIG. 23 is a sectional view taken along line I-I' of FIG. 1 according to still another embodiment. In this embodiment, a noise reduction member 930 is interposed between the cover 920 and the cyclone unit 700. The noise reduction member 930 is formed in a shape corresponding to the cyclone unit 700 to enclose the outer circumference of the cyclone unit 700.

The noise reduction member 930 may be formed of a sound absorption material such as a porous material or a sound shielding material for intercepting the sound.

In this embodiment, since the noise reduction member 930 is interposed between the cover 920 and the cyclone unit 700, the noise generated from the cyclone unit 700 is primarily absorbed or intercepted and secondarily reduced and intercepted by the cover member 310. Furthermore, since the noise reduction member 930 is disposed to enclose the cyclone unit 700, the vibration generated from the cyclone unit 700 can be also reduced.

U.S. Pat. Nos. 6,974,488, 6859,975, 6,782,584, 6,766,558, 6,732,406, 6,601,265, 6,553,612, 6,502,277, 6,391,095, 6,168,641, and 6,090,174 all disclose various types of vacuum cleaners. The methods and devices described above would all be applicable and useful in the vacuum cleaners described in these patents. The disclosure of all of the above-listed patents is hereby incorporated by reference. Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A vacuum cleaner, comprising:

a main body;

a dust collection device that is removably mounted on the main body;

a main cyclone dust separation device mounted on the dust collection device;

a secondary cyclone dust separation device mounted on the main body, wherein the secondary cyclone dust separation device receives a flow of air that has already passed through the main cyclone dust separation device; and a cover mounted on the main body that at least partially surrounds the secondary cyclone dust separation device and that is configured to attenuate noise produced by the secondary cyclone dust separation device, wherein the dust collection device is capable of detaching from the main body in a state in which the secondary dust separation device is mounted on the main body.

2. The vacuum cleaner of claim 1, wherein the cover is configured and mounted on the main body such that a separation space is maintained between an exterior surface of the secondary dust separation device and an interior surface of the cover.

3. The vacuum cleaner of claim 2, wherein a sound absorbing material is mounted in the separation space.

4. The vacuum cleaner of claim 2, wherein noise reduction recesses are formed on the interior surface of the cover.

5. The vacuum cleaner of claim 4, wherein the recesses comprise dimples.

6. The vacuum cleaner of claim 4, wherein the recesses comprise grooves.

7. The vacuum cleaner of claim 1, wherein the secondary cyclone dust separation device comprises a plurality of cyclones.

8. The vacuum cleaner of claim 7, wherein the plurality of cyclones of the secondary cyclone dust separation device are arranged in a fan shape.

9. The vacuum cleaner of claim 8, wherein the cover has a shape that substantially matches the fan shape of the plurality of cyclones of the secondary dust separation device.

10. A vacuum cleaner, comprising:

a main body;

a cyclone dust separation device mounted on the main body; and a cover that at least partially surrounds the cyclone dust separation device, wherein recesses are formed on an interior surface of the cover, and wherein the recesses arc configured to attenuate noise generated by the cyclone dust separation device.

* * * * *